June 13, 1944.    D. GABOR    2,351,032
SYSTEM OF PHOTOGRAPHY AND PROJECTION IN RELIEF
Filed Aug. 3, 1940    7 Sheets-Sheet 1

Inventor
Dennis Gabor
By Stone, Boyden & Mack
Attorneys

June 13, 1944.                D. GABOR                2,351,032
SYSTEM OF PHOTOGRAPHY AND PROJECTION IN RELIEF
Filed Aug. 3, 1940                7 Sheets—Sheet 2
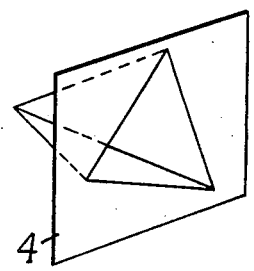
Fig. 6
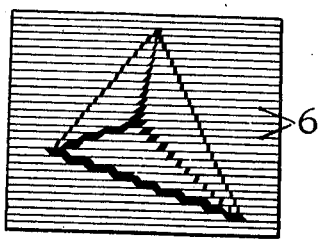
Fig. 7
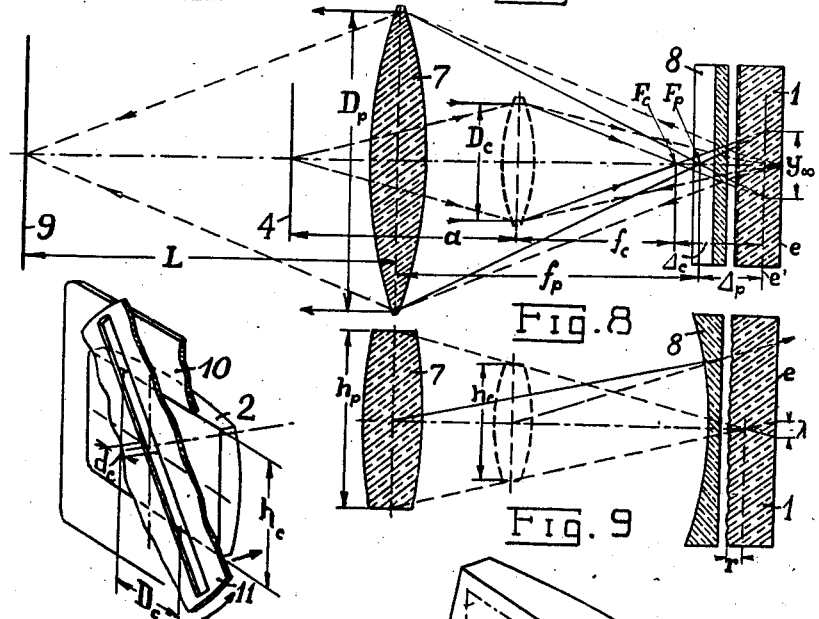
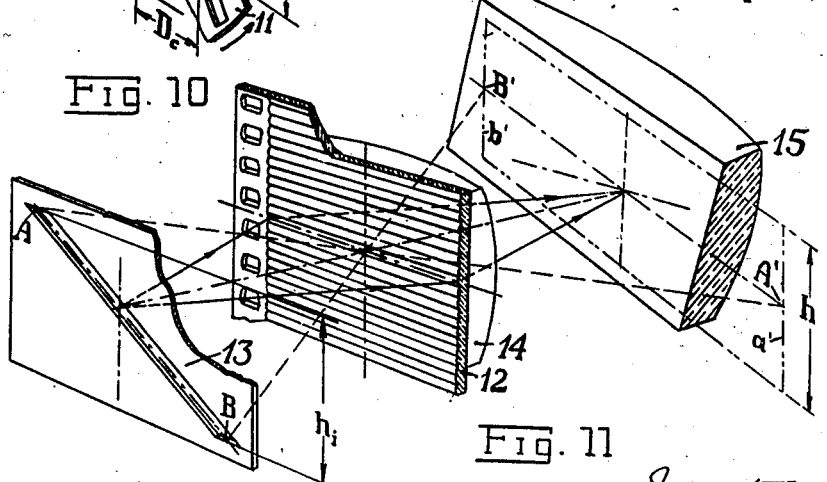

June 13, 1944. D. GABOR 2,351,032
SYSTEM OF PHOTOGRAPHY AND PROJECTION IN RELIEF
Filed Aug. 3, 1940 7 Sheets-Sheet 7

Inventor
Dennis Gabor
By Stone Boyden & Mack
attorneys

Patented June 13, 1944

2,351,032

UNITED STATES PATENT OFFICE 2,351,032

SYSTEM OF PHOTOGRAPHY AND PROJECTION IN RELIEF

Dennis Gabor, Rugby, England

Application August 3, 1940, Serial No. 350,803
In Great Britain May 3, 1940

15 Claims. (Cl. 88—16.6)

This invention relates to the production and projection of photographic pictures with stereoscopic effect. More particularly it relates to cinematographic films, and methods of producing and projecting the same, which produce stereoscopic moving pictures if projected on projection screens as described in a co-pending application, Serial No. 350,804, filed August 3, 1940, or if used in conjunction with any projection system operating according to the principles specified therein.

Systems according to my said co-pending application operate as follows: A projector is used with a horizontal aperture width $D_p$, in conjunction with a projection screen, which produces a multiplicity of images of said aperture, in the form of equidistant bands of a width $D_p$, with a spacing equal to the smallest lateral spacing of two seats in the audience of the cinema theatre. Said image bands are contained in one or more planes, which register at least approximately with the plane or planes passing through the eyes of the audience when seated, each image band registering with a column of seats. If a film is projected which appears in relief when viewed from the aperture of the projecting lens, said system will produce of this a multiplicity of spatial pictures, enlarged laterally and even more enlarged longitudinally, i. e. in depth. Each member of the audience will see only one of said spatial pictures, and he will see it binocularly so long as both his eyes are inside one of said image-bands or zones of vision. Therefore the horizontal width $D_p$ of the projector aperture must be large enough to allow every member of the audience a certain latitude of movement to the right or left.

The object of this invention is a film picture, which will appear in relief when viewed from the projector aperture, and which therefore fulfils the requirements of the method of producing stereoscopic pictures according to the copending application. The raw film is a lenticular film with cylindrical gofferings, the focal plane of which coincides with the photographic emulsion. Such films are known in themselves. The present invention consists in novel methods and devices for taking, printing and projecting stereoscopic pictures with lenticular films.

According to my invention the film is exposed during the taking of the picture through a lens with an aperture or stop in the shape of a slit, including an acute angle with the axis of the lenticules of the film. Subsequently the negative film is reversed or preferably printed on a similarly goffered positive film, and eventually projected through a projector lens, which in turn has an aperture or stop in the shape of a slit, including an angle with the lenticules. The width, length and inclination of the slits used in taking the picture and in projecting it will be in general different, and one has to be adjusted to the other so as to obtain the correct depth in the final reproduction. The axis of the lenticules may be horizontal, or may include an acute angle with the horizontal. In a preferred form of the invention said angle is chosen so that the correct depth is obtained at a horizontal position of the projector slit.

It has been proposed before to use lenticular films for stereoscopic pictures, and also slit shaped stops, but only at right angles to the lenticules. The characteristic feature of the present invention is however the acute—preferably small—angle between the slits and the lenticules. This entails the double advantage of continuous recording of depths, and easy and independent adjustment of the scale of depths by varying said angle. Both advantages vanish if one or both of the slits are at right angles to the lenticules.

In the following specification it is set forth in some detail in what manner film pictures according to the above fundamental principle of my invention may be taken, printed and projected.

Film pictures according to the invention are taken with a novel modification of the usual film cameras, in which the focussing movement of the lens is coupled with a turning movement of the slit, in such a way that the apparent relief automatically assumes the correct depth.

The printing of lenticular films presents special difficulties which have mainly prevented the general use of color films based on the lenticular principle. According to the invention a special printing system is used, which in combination with other features of the invention reduces the loss of definition by printing to a small fraction of the corresponding loss in the case of lenticular color films. Moreover the printer is provided with means for the standardization of records taken with cameras with different focal lengths, so that the standardized prints can be projected with correct depth reproduction in all cinema theatres conforming to a certain rule.

I describe further a new projector for films according to the invention. If these films were projected through a narrow projector slit, most of the light would be lost. According to the invention a new illuminator system is used, which allows projection almost without loss of light.

Projectors according to the system of producing stereoscopic moving pictures as described in the co-pending application must have wide horizontal apertures, exceeding the normal eye spacing and preferably of the order $D_p=200$–$350$ mms. But a fundamental optical theorem—the Sine theorem of Abbe—restricts the maximum possible aperture of a lens of a given focal length, and the focal length of projector lenses is prescribed by the dimensions of the cinema theatre, the screen and the film frame. A novel method is described by means of which projector systems may be constructed with apertures exceeding the above mentioned theoretical limit.

I describe also a novel method of producing stereoscopic color films, which can be projected with the same projector as black and white films, without any additional devices such as rotating shutters, filters or the like. Finally I describe a novel method of producing stereoscopic animated cartoon films. All these parts of the invention are closely connected with one another by the above principle of recording pictures in relief, and they are also closely connected with the method by which the spatial images are eventually produced in the cinema theatre, as described in a co-pending application.

In the accompanying drawings

Fig. 1 illustrates the principle of recording pictures in relief on a lenticular film by means of a lens fitted with a stop in the form of a slit, inclined against the lenticule axes.

Figs. 2, 3 and 4 are in turn sectional elevation, rear view and plan section of substantially the same arrangement as shown in Fig. 1 in perspective view. They illustrate in some detail the recording of points at a greater distance from the camera than the plane which is sharply imaged in the photographic emulsion. Fig. 5 shows the records of points nearer than said plane.

Fig. 6 is a perspective view of a tetrahedron and Fig. 7 the picture of the same, as it is recorded in the photographic emulsion according to the invention.

Figs. 8 and 9 are diagrammatic illustrations in two plane sections at right angles to one another of the processes of taking pictures and projecting the same, and contain also the explanation of the symbols used in the theory of said processes. Fig. 10 illustrates the linked movements which have to be executed by the lens and the slit-shaped stop of the camera in taking pictures of scenes at different distances from it.

Fig. 11 illustrates the principle of projecting stereoscopic pictures according to the invention without loss of light in the projector aperture.

Figure 18:
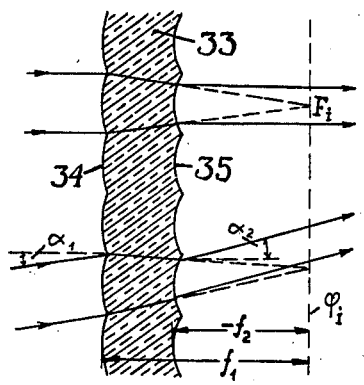
Figure 19:
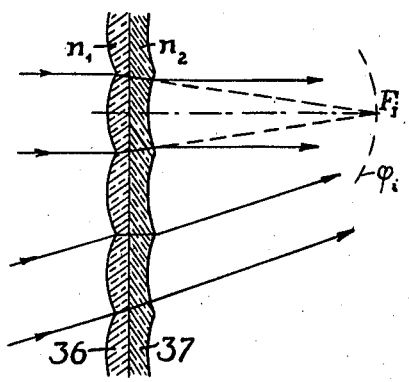
Figure 20:
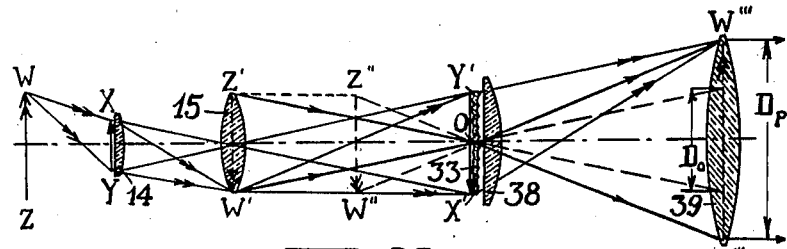
Figure 21:
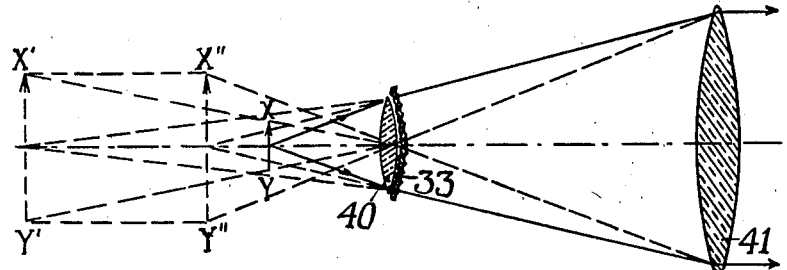
Figure 22:
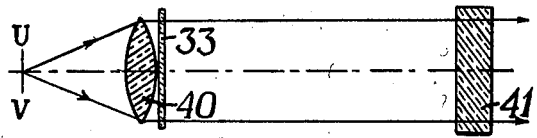

In optical systems of the conventional kind the aperture width can never exceed twice the focal length. Figs. 18 to 22 explain a novel addition to such optical systems, by means of which said limit can be exceeded. This consists in the use of afocal plates plates as shown in Fig. 18. Fig. 19 shows an improved type of afocal plates. Fig. 20 shows diagrammatically a projection system which forms an intermediary image of the film and contains an afocal plate coinciding with said intermediary image. Figs. 21 and 22 illustrate in plan and elevation the use of afocal plates as imaging elements in projector systems.

Figure 23:
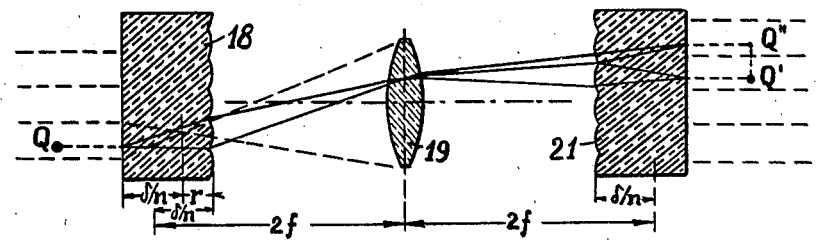
Figure 24:
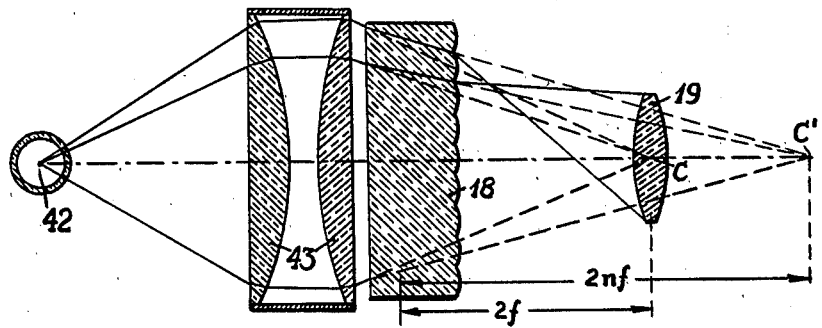
Figure 25:
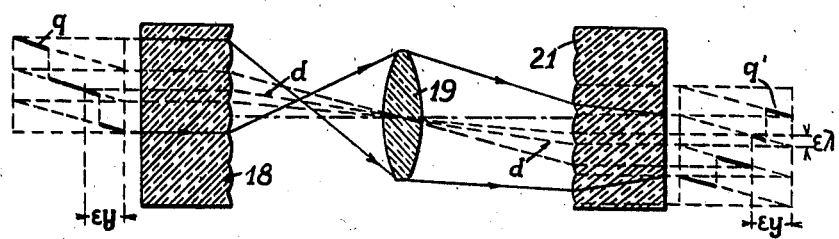
Figure 26:
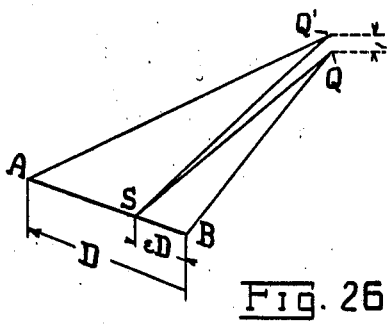
Figure 27:
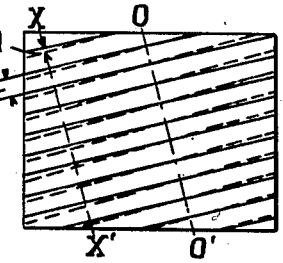

Figs. 23–27 explain the printing process. Fig. 23 explains the loss of definition incurred in the usual method of printing lenticular films. Fig. 24 is an illuminating system for the printing process according to the invention. Fig. 25 illustrates the reproduction of the image of a single spatial point. Fig. 26 illustrates the effect on the reproduction of a spatial point in projection according to the co-pending application, if the negative and positive films have failed to register in the printing process. Fig. 27 illustrates the effect of printing on a positive film with lenticules having inclinations slightly different from the inclination of the lenticules of the negative film.

Figures 28, 29:
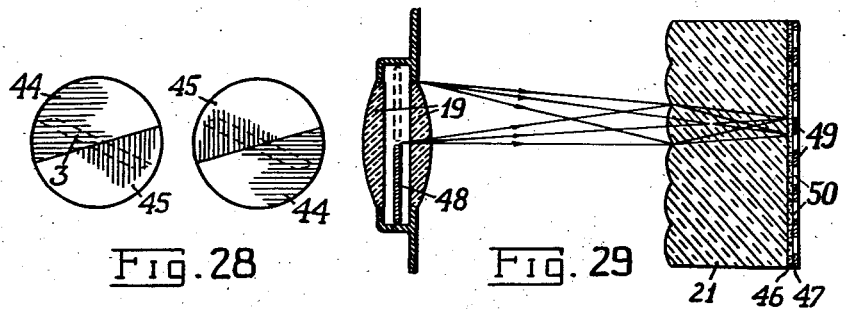

Figs. 28 and 29 illustrate a method for producing stereoscopic color pictures according to the invention. Fig. 28 shows the positions of rotating filters before the camera slit in taking two consecutive frames. Fig. 29 shows the special positive film used for printing the negative, and illustrates the method by which the zones in said positive film may be colored in the same colors as the filters through which the corresponding zones in the negative film were illuminated during the taking of the picture.

Figures 30, 31:
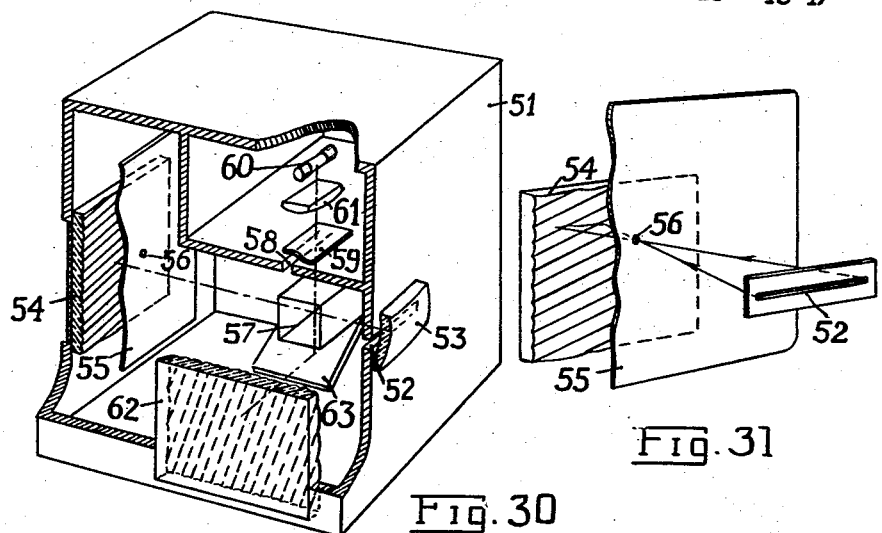
Figure 32:
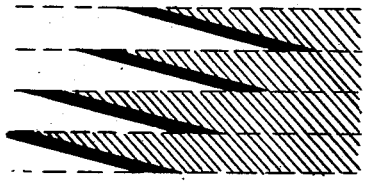
Figure 33:
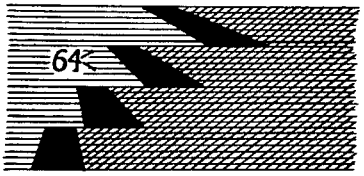
Figure 34:
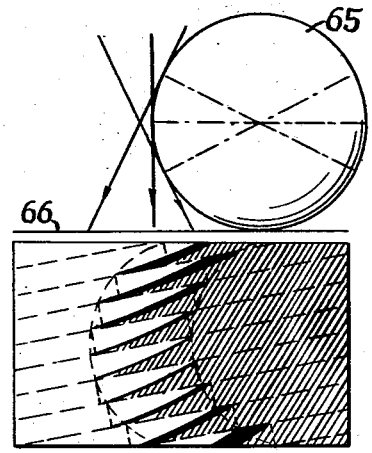

Fig. 30 is a device for producing stereoscopic animated cartoons. Fig. 31 is an illustration of the principle employed. Fig. 32 shows the coloring or shading of the image of a surface bounded by a line. Fig. 33 illustrates the coloring of such surfaces by means of capillary action. Fig. 34 shows the representation of a body, not bounded by a line, but by outlines which appear different from different points of view, demonstrating that in the system according to the invention bodies can be always drawn with a coherent outline.

Figure 1:
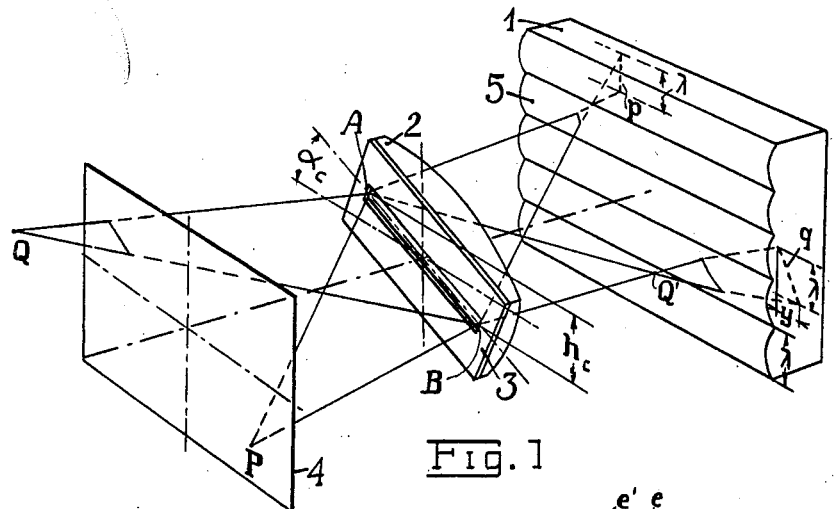

The fundamental arrangement for taking stereoscopic pictures according to the invention is illustrated in Fig. 1. A lenticular film 1 is arranged behind the lens 2 of the camera. The lens is fitted with a slit shaped stop 3, which includes an acute angle $\alpha_c$ with the lenticule axes. For the purpose of simpler explanation the lenticules are shown horizontal and the lens as a simple lens, but it may be understood that the lenticules themselves may also include an acute angle with the horizontal, and that the lens may be a compound lens, with the slit-shaped aperture in the plane of the stop, i. e. in or near the plane of the equivalent simple lens which can be substituted for said compound lens.

The lens and the film are so arranged relatively to one another that a plane 4 is sharply imaged by said lens in the emulsion of the film. This plane 4 may be called the "first plane." The lenticules themselves satisfy the usual condition that their focal surface coincides with the emulsion. As the lens is at a distance from the film large against its thickness, i. e. large against the focal length of the lenticules, said lenticules will image the slit—very approximately—in a number of horizontal bands or "zones," one zone for each lenticule. The emulsion is best utilized if said zones cover the emulsion without gaps and without overlapping, i. e. if their width is equal to the width $\lambda$ of the lenticules. This optimum case has been assumed in Fig. 1 and also in the other drawings in this specification, but it may be understood that it need not be exactly realized.

Fig. 1 explains how this optical system forms images of spatial points in the photographic emulsion. In order to distinguish these from other images they may be called "traces." Two examples are shown, a point P in the "first plane" 4, and a point Q outside this plane, at a larger distance from the camera.

If the films were not lenticular, a point P in the plane 4 would be sharply imaged in the emulsion as a point. The lenticules do not interfere with the focussing of rays in planes parallel to the lenticule axes, but they merely spread out the former image point at right angles to said direction into a vertical line $p$ of a length $\lambda$. This can be understood by considering that a ray passing through the left end A of the slit, which is in the highest position will cross the rear face of the lenticular plate in the lower edge of the image band or zone corresponding to the lenticule 5 and a ray passing through B will pass through the upper edge of said zone. Both rays must cross the rear face in the same vertical line, as the horizontal cylindrical lenticules produce no appreciable horizontal deflections.

In the case of a point Q, which is not in the plane 4, in the absence of lenticules a linear trace of the rays would be formed in the emulsion, parallel to the slit. If $y$ is the horizontal projection of this trace, it can be easily understood that this length $y$ remains unaffected by the lenticules as these are themselves horizontal and therefore do not produce horizontal deflections. Considering the vertical direction, it follows in the same way as in the case of the point P that the trace must extend across one image band, i. e., its vertical projection will be $\lambda$. We obtain therefore for a point Q again a straight trace $q$. The trace has a constant height $\lambda$ and a horizontal width $y$, which is a function of the distance of the point Q. In other words, spatial points will be represented by straight traces, with an inclination against the lenticule axes depending on the distance of said point from the "first plane" 4 which is sharply imaged in the emulsion. Points behind the first plane will be represented by traces inclined in the same sense as the slit, points before said plane by traces inclined in the opposite sense.

The manner of recording according to the invention can be also shortly described as recording the different views of a spatial point—i. e. its views as seen from different points of the slit shaped aperture—below one another in every zone of the emulsion. More exactly, these views are recorded as they appear to the right or left of a point in the first plane which covers the spatial point when viewed from the central point of the aperture.

If now the plate or film, after developing, reversing—i. e. changing blacks into whites and vice versa—and fixing is put back into the camera in the same position and is illuminated from behind, the trace $q$ corresponding to a point Q will be imaged in the same spatial position as Q was originally, not however as a point, but as a short vertical line. Those rays which happen to illuminate the trace $q$ in the same directions as the rays which originally formed the photographic record of Q will cross exactly through Q. The other rays however will pass through the surface of the lenticule at different heights, and these will form a "caustic" passing through Q, in the form of a short vertical line, with a length which appears from the lens at the same angle as the width $\lambda$ of a lenticule. There is therefore a certain loss of "vertical definition," which can be expressed by the number of horizontal lines which can be resolved by a given lenticular film. The latter is the same as the number of lenticules per frame. 300 lines may be considered as satisfactory under normal cinema conditions.

Figure 2:
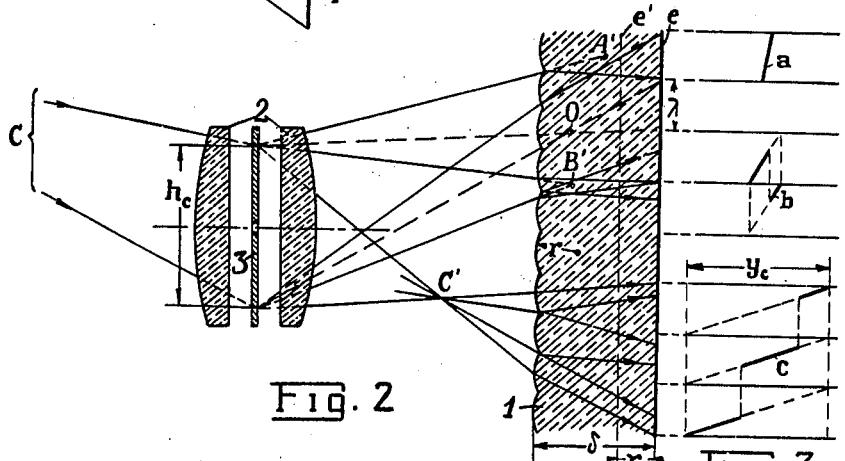
Figure 3:
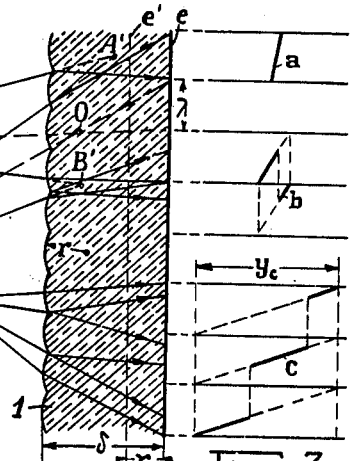
Figure 4:
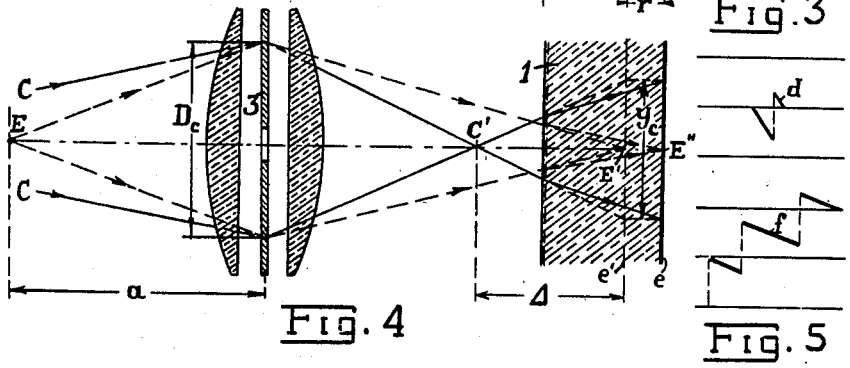

In Fig. 1 it has been assumed, that the beam corresponding to the spatial point Q is so narrow that it strikes only one lenticule. This is true only for points in or near the first plane. Figs. 2–4 explain the construction of the traces in the general case, and in more detail. Figs. 2 and 4 are sectional elevation and plan section of essentially the same arrangement as in Fig. 1, only the lens 2 is shown as a compound objective, with the aperture 3 in its stop plane. Fig. 3 is the rear view of the emulsion.

Fig. 4 explains the dioptrical conditions in the horizontal plane, or in any plane parallel to the lenticule axes and passing through the centre of the lens. The point E in the first plane 4, at a distance $a$ from the camera is imaged by the lens in a point E', at a distance $\delta/n$ from the front face of the film, if $\delta$ is the thickness and $n$ its refractive index. By refraction at said front face the point E is eventually imaged at E'', in the emulsion $e$ of the film. The plane $e'$ passing through E' is the image of $e$ as it appears when viewed from the front side.

The lenticules have curvature radii $r$ so adjusted that their focus coincides with the emulsion $e$. A well known dioptrical formula gives $r=\delta.(n-1)/n$. This is the same as the distance between $e$ and $e'$.

The zones in which the slit will be imaged can be constructed by drawing straight lines from the highest and lowest point of the slit through the curvature axes. This is shown in Fig. 2 in the case of an axis which appears here as a point O. These rays fall on the lenticules at right angles and will therefore pass through them unbroken. As the distance of the lens from the film is roughly equal to the focal length $f_c$ of the camera, this construction gives a width $\delta h_c/nf_c$ for the width of said zones or image bands. In order to obtain full utilization of the film this must be equal to the period $\lambda$ of the lenticules. This gives the condition $$h_c/f_c = n.\lambda/\delta \qquad \text{Eq. 1}$$

This is formally identical with the condition observed in color photography with lenticular films, but with the important difference that in this formula $h_c$ is not the linear aperture of the lens, but the projection of the slit length at right angles to the lenticules.

In order to be able to show details, the film thickness in Figs. 2 and 4 could not be shown small against the lens distance. Therefore in the drawings, the width of the zones representing image-bands of the lens appears appreciably larger than the lens period $\lambda$.

Figs. 2 and 4 contain the construction of the images of three points A, B and C at increasing distances from the "first plane" and away from the lens, which means that their spatial images A', B' and C' are progressively nearer to the lens, and farther from $e'$. Their respective traces in the emulsion are "$a$," "$b$" and "$c$," shown in rear view in Fig. 3. In the case of A' the beam strikes only one lenticule, and therefore the construction of "a" is the same as for "q" in Fig. 1. The beam can enter through a single lenticule only if its width is less than $\lambda$. But a beam narrower than $\lambda$ can also be split. This is shown in the case of the point B'. The ray which falls on the dividing line between two lenticules will be split up and forms two images in the emulsion, vertically above one another, at corresponding points of the respective zones of the two lenticules. The trace "b" is therefore split up in two, as shown in Fig. 3. The two parts of the trace lie on two lines, vertically above one another, displaced by $\lambda$, with an inclination corresponding to the distance of the spatial point.

The image of the point C' is split up in three traces, as the beam enters through three lenticules. It can be seen that this image "c" differs from "b" also in that the extreme ends of the trace right and left are maximally spaced vertically, whereas in the case of "b" they had minimum vertical spacing. The reason is, that the rule of splitting up the traces changes when the point crosses through the lens surface, in which position the beam width is zero. Fig. 4 shows the construction of the horizontal width $y_c$ of the trace "c."

Figure 5:
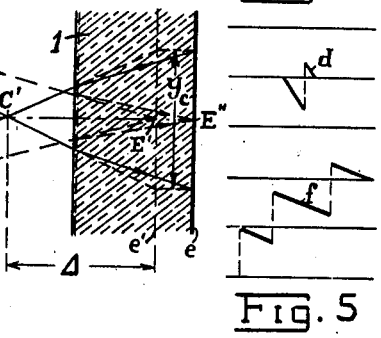

Fig. 5 shows traces corresponding to object points before the "first plane." Here "d" is the trace of a point near the first plane, "f" corresponds to a point at a greater distance from 4 and nearer to the camera. It can be seen that the rule of splitting up is the same for "d" and "f" in Fig. 5, unlike "b" and "c" in Fig. 3, for the reason that the corresponding points are all behind the goffered surface of the film, and not at different sides as in Fig. 3.

We can summarize these different traces as follows: The representation of a point consists always of a number of straight lines, with an aggregate projection $\lambda$ at right angles to the lenticules and an aggregate projection $y$ in the direction of the lenticules, $y$ being the same as if the film were not lenticular and the slit had been replaced by a slit parallel to the lenticules, of a length equal to the projection $D_c$ of the slit in said direction. $y$ depends therefore only on the camera, not on the lenticules.

If the film—after developing, reversing and fixing—is put back into the camera and illuminated from behind, it will again reproduce the original points in the same spatial position, again with a certain loss of vertical definition. It can be seen however that in the cases "b" and "c" in Fig. 3 and "d" and "f" in Fig. 5, where the trace is produced by more than one lenticule, the vertical length of the "caustic" which in the projection replaces the original point may become twice as large as before. This does not mean necessarily that half of the vertical definition is lost. Closer investigation shows, that the light distribution in the caustic is such that it appears to the eye little if at all longer than corresponding to $\lambda$. In extreme cases—"close ups" with considerable depth, taken with long focus camera—the apparent loss of definition might approach the maximum. But in these cases definition in the background will be lost also if an ordinary camera is used with an ordinary film.

Figs. 6 and 7 show the representation of a spatial object in the example of a tetrahedron, the base of which rests on the "first plane" 4. Fig. 7 shows the picture in the emulsion. In order to make it clearer, the lines 6 dividing the zones corresponding to the individual lenticules are shown as thin horizontal lines. In reality they would be invisible. The image of a straight line consists of a number of trapezoids, which in the case of lines in or parallel to the first plane become parallelogramma. It can be seen that in the case of the nearly horizontal lines the trace becomes wide, and it can be inferred that its spatial position in depth—at right angles to the plane of the drawing—cannot be determined from the representation as exactly as the spatial position of the nearly vertical lines. But this corresponds exactly to the peculiarities of binocular vision. The distance of horizontal lines cannot be determined by focussing the eyes on them, but only by inference from the position of their ends, or from neighbouring more or less vertical lines.

In the reproduction of spatial images a new problem arises, which is absent in the taking and reproduction of flat pictures. This is a consequence of a general theorem of geometrical optics, valid for any lens or combination of lenses. The longitudinal magnification is always the square of the lateral magnification. This means that if we have a picture which gives the correct relief if projected e. g. in natural size, it will give a very strongly distorted relief in magnifying projection, as the depth dimensions will be stronger enlarged than the lateral ones. It is therefore necessary to adjust the camera in such a way that the picture shall have the correct relief when projected in the cinema theatre.

Figs. 8 and 9 explain this problem and its solution according to the invention. Fig. 8 is a sectional plan and Fig. 9 a sectional elevation of a projector which is built on essentially the same lines as the camera. The illustration is diagrammatical. The projector lens 7 is to be understood to contain a narrow slit shaped aperture in its stop plane. The dimensions $D_p$ and $h_p$ as shown in Figs. 8 and 9 are to be understood to mean the horizontal and the vertical projection respectively of the projector slit, in just the same way as the quantities $D_c$ and $h_c$ are defined in Fig. 1. The suffixes "p" and "c" will denote in the following always quantities relating to the projector and to the camera respectively. The Figs. 8 and 9 show also in broken lines the camera lens—more exactly: the camera slit—in the same relative position to the film 1 which it occupied during the taking of the picture. The film 1 may be understood to be the original, after fixing and reversing treatment, or an identical positive replica. The projector contains in addition a cylindrical lens 8, very near to the lenticular surface of the film and with its axis parallel to the lenticule axes.

4 is again the "first plane," which during the taking of the picture was at a distance $a$ from the camera lens. We assume that in the projection this plane is to be reproduced in the plane 9 of the projection screen itself, which is at a distance L from the projector. This condition will be in general observed in stereoscopic projection, as it is desirable to obtain the best definition in the plane which is nearest to the audience, i. e. in the plane of the screen itself.

In order to obtain correct spatial reproduction we must impose the further condition that points at infinity must be reproduced at infinity. This can be formulated from Fig. 8, by means of the dioptrical law in the form given by Abbe:

$$\Delta_c \cdot (a - f_c) = f_c^2$$

where $\Delta_c$ is the distance of the focus $F_c$ from the emulsion, or, more exactly, from the plane $e'$.

As $f_c$ is always small against the distance $a$, this means with good approximation $$\Delta c/f_c = f_c/a$$

Therefore the horizontal width $y\infty$ of the trace corresponding to a point at infinity will be $$y\infty = D_c\Delta c/f_c D_c/a \qquad \text{Eq. 2}$$

As we have assumed that the film has been reversed or printed in original size, $y\infty$ is the same in the positive as in the negative film. Therefore the condition that infinity is again represented as infinity becomes $$f_c D_c/f_p D_p = a/L \qquad \text{Eq. 3}$$

In general moving pictures are taken from much smaller distances than they are projected. As an example we assume that a scene is taken from a distance $a=4$ meters and projected in a large cinema theatre from a distance of 40 meters. The focal length of the camera objective may be 50 mms., the focal length of the projector 100 mms. This corresponds with a frame size of 16 x 20 mms., to a screen size of 6.4 x 8 meters. The horizontal width of the projector lens may be 200 mms. Therefore in order to represent infinity at infinity, Eq. 3 prescribes a horizontal camera aperture $D_c$ of 40 mms.

A second relation between camera and projector can be formulated from Fig. 9, which shows the conditions at right angles to the lenticules. Assuming that the positive and negative films are identical or at least goffered in the same way, Eq. 1 gives $$h_c/f_c = h_p/f_p = n\lambda/\delta \qquad \text{Eq. 4}$$

This means that the heights or vertical projections of the aperture-slits in camera and projector must be in the same relation to the resp. focal lengths. As an example we may assume a film of 0.15 mm. thickness, with 20 lenticules/mm.,—320 per frame—i.e. $\lambda=0.05$ mm., and a refractive index $n=1.5$. This gives $h/f=0.5$, both for camera and projector. In the above example we obtain $h_p=50$ mms., and $h_c=25$ mms.

The above aperture condition ensures that the central zones of the film, i. e. zones which in Fig. 9 appear near the axis will be imaged on the projector aperture. But if the camera and the projector have different focal lengths, this condition, although necessary, is not sufficient to ensure that also zones outside the axis will be imaged on said aperture. This is corrected by the cylindrical lens 8 which images the projector aperture at a distance $f_c$ before the film, so that it appears in the same relative position to the film as the camera aperture was when the picture was taken. This cylindrical correcting lens does not interfere with the optical conditions in the direction of the lenticules, as illustrated in Fig. 8.

A film according to the invention can be projected with correct spatial reproduction in any cinema, if the three quantities $f_p$, $D_p$ and $h_p$ are chosen so as to satisfy the two equations 3 and 4. Of these however $f_p$ is determined by the size of the screen, and the choice of $D_p$ is limited by the condition according to the co-pending application that the width of the zones of vision shall not be less than to allow sufficient freedom of movement for the members of the audience. This prescribes a minimum width $D_p$, which is the same in short cinemas and in long ones. It is therefore preferable to take the film in such a way that the value of $D_p$ following from Eq. 3 shall be sufficiently large even for the shortest cinema theatre in which it is desired to show the film. In this case in longer cinemas $D_p$ might turn out larger than needed, but it is not of course necessary to utilize the whole width.

Correct spatial reproduction is therefore ensured according to the invention by adjusting the inclination of the camera slit for every distance $a$ in such a way that $$f_c D_c/a = f_p D_p/L = \text{const.} \qquad \text{Eq. 5}$$

whilst leaving the height $h_c$ constant, (so long as $f_c$ is not changed).

Fig. 10 illustrates in a diagrammatic way the means according to the invention for realizing this condition. The camera lens 2 is covered by a frame 10 with a rectangular opening of a height $h_c$, and before this is arranged a disc 11 with a slit, which can be rotated around the camera axis. This turning movement may be linked with the focussing movement of the lens in direction of the camera axis—e. g. by a suitable helix—in such a way that the horizontal projection $D_c$ of the slit varies proportionally to the distance $a$ at which the camera is sharply focussed. Therefore by focussing the camera correct spatial reproduction is automatically obtained.

The easy control of depth-reproduction, merely by turning a slit is a characteristic feature of the invention, and entirely absent in systems using rasters or lenticular films as proposed hitherto.

By adjusting the camera and the projector to one another in such a way that the "first plane" corresponds to the screen and infinity to infinity, the reproduction is entirely defined, but the spatial pictures seen from different seats in the audience of the cinema threatre will be somewhat different, as explained in the co-pending application. The depth reproduction will be strictly correct for observers, whose distance from the screen is in the same ratio to the projector distance as the focal length of the camera to the focal length of the projector. Observers nearer to the screen will see the picture somewhat foreshortened, observers at greater distance will see it proportionally deeper. If it is desired to obtain the "perspectivic point" in the middle of the audience the focal length of the camera has to be one half of the focal length of the projector, as in the above example.

The width $d_c$ of the aperture-slit—Fig. 10—is determined by the horizontal definition desired. For points in the "first plane" the slit width does not matter, but the condition becomes more stringent for points outside this plane, i. e. the slit must be made narrower for deep pictures. If it is desired to obtain the same "depth focus" as in ordinary flat pictures, the slit can be made obviously as wide as the diameter of the circular apertures through which a flat film would be exposed under the same conditions. But in stereoscopic pictures it is desirable to have the background better defined than in flat pictures, as a diffuse background destroys to a certain extent the effect of reality. Using a camera slit with a horizontal width $d_c$—Fig. 10—points at infinity will be represented in the emulsion not by sharp lines but by bands with a horizontal width $$w\infty = f_c d_c/a \qquad \text{Eq. 6}$$

This will be reproduced by the projector and by the projection screen according to the co-pending application as a beam with a slight horizontal divergence $$\gamma = w\infty/f_p = f_c d_c/f_p a \qquad \text{Eq. 7}$$

The point at infinity will appear sharp if this angle is smaller than the limit of eye resolution, which for cinema pictures is at least 2', or $5.8 \times 10^{-4}$ radians. Considering again the example $a = 4$ meters, $h_c/f_p = 0.5$, we obtain $d_c = 13.8$ mms., and with $h_c = 25$ mms., as calculated above, an effective lens area of 3.45 cm². This is equivalent to a circular aperture of 21 mms. diameter, or—with $f_c = 50$ mms.—to an effective focal ratio $f/2.4$. It can be seen therefore, that even in the case of scenes with considerable depth—4 mms. to infinity—the effective apertures can be kept almost as large as usual, if camera lenses with short focal length are used. It is advisable to take "close-ups" with short focus, and outdoor scenes with a somewhat longer focus, as the large lens widths $D_c$ following from Eq. 3 in the case of large distances $a$ are difficult to realize with lenses of short focal length.

So far I have assumed that the projector—as in Figs. 8 and 9—is of a design similar to the camera, with a slit in the stop plane of the projecting lens. This however entails considerable loss of light, especially as in order to obtain good definition, the projector slit will have to be in general narrower than the taking slit. This difficulty is overcome according to the invention by a special design of the projector, diagrammatically explained in Fig. 11.

In Fig. 11 the positive film 12 is turned with its goffered side not towards the projecting lens, but towards an illuminator slit 13, the vertical projection $h_i$ of which is so determined that the image bands of the slit formed by the lenticules cover the emulsion without gaps, and without overlapping. The film is backed by a lens 14. For the purpose of explanation we may consider this as a thin lens, which does not change the image of the film appreciably as it very nearly coincides with it. This lens is so designed, that if the film were not lenticular, it would project a sharp image of the slit 13 on the main or projecting lens 15, which in turn projects an image of 12 on a screen according to the co-pending application. In order to simplify the explanations let us assume for a start that the positive film has been produced out of the negative by reversing. In this case we place the illuminator slit before the film at a distance $f_c$, i. e. at the same distance as the slit of the camera was when the picture was taken, and we make also $h_i = h_c$. In this case, whatever the horizontal length of the illuminator slit, it will illuminate the emulsion through the lenticules in the same zones in which the picture is recorded. Any horizontal line in any one of said zones will receive light only from one point of the illuminator slit, which for simpler explanation we will consider as very narrow. Every one of said lines receives light in a convergent bundle, corresponding to the angle at which the corresponding lenticule appears from said line. After leaving the emulsion this bundle diverges vertically under an angle somewhat increased by refraction, which by reason of Eq. 4 is the same angle as at which $h_c$ appears from the film. This vertical divergence will not be substantially affected by the lens 14, as the lens practically coincides with the film. Let us now consider the same bundle in a plane passing through said horizontal line and the point of the illuminator slit from which it has issued. As this plane is parallel to the lenticule axes their effect on the bundle is nil. Therefore in this plane we obtain focussing of the bundle by the lens 14 in the plane 15 in just the same way as if there were no lenticules. Summarizing, we see that every horizontal line in the emulsion will be illuminated from one point of the slit 13 only, and that after passing the film and the lens 14 these rays will form an astigmatic bundle, with a vertical caustic in the plane of the projector aperture 15. This caustic will have a length $h$, which appears seen from the film at a standard angle, given by the lenticulation of the film.

It can be understood theerfore that although the image of the slit 13 has been spread out by the lenticules, so that it covers a lozenge-shaped area, as shown in Fig. 11, every ray will arrive at the main lens 15 at the same horizontal distance from the centre as if the film were not lenticular. In other words, the rays will pass through the projector lens 15 at the same horizontal distance as if 15 had a slit-shaped aperture on the place of the image A'—B' of 13, formed by 14, in the absence of the lenticules. The difference is only that instead of every ray, a narrow vertical fan of rays is emitted from every vertical zone of the projector lens, which fan converges in a point at the screen surface. But binocular vision exists only in the horizontal direction, therefore the substitution of a fan for a ray will not be noticed, as the eye can pick out only one ray out of the fan, viz. the ray which passes through the eye and the point on the screen in which said fan converges. There is theerfore no loss of vertical definition.

So far we have assumed, for the purpose of explanation, that the illuminator slit A—B has been placed before the film at the distance $f_c$, the focal length with which the picture was taken. But this would mean changing said distance during the projection as "close-ups" alternate with long range pictures. This is not necessary if the positive has been printed from the negative with a printer of standard lens distance. In this case the illuminator distance is made equal to said distance and can be standardized once for all. This distance is kept constant in all theatres with different focal lengths $f_p$ of the projector. Merely the lens 14 has to be adjusted in such a way that it images the illuminator lens at a distance $f_p$ from the film.

The advantage of this projection system is, that every ray which passes through the illuminator slit and the film is utilized. Examples of illuminator systems by means of which practically the whole light energy of suitable light sources may be made to pass through a narrow slit and through the film frame will be given later.

In the examples so far given the lenticules were horizontal. This leads, as shown, to projectors with inclined apertures. In a preferred form of the invention the lenticules are inclined to the horizontal under such an angle $\beta$ that the projector slit becomes horizontal in the case of correct spatial reproduction. From Eqs. 3 and 4 we obtain $$\tan \beta = h_p/D_p = \frac{f_p^2}{L}\left(n\frac{\lambda}{\delta} - \frac{a}{f_c D_c}\right) \qquad \text{Eq. 8}$$

The expression in brackets is a constant, according to Eq. 7. Therefore in cinemas in which the projector aperture is to be exactly horizontal, the ratio $$f_p^2/L$$

has to be kept constant. This means that in such cinema theatres the screen size will be proportional to the square root of the theatre length, i. e. relatively larger for short theatres. This meets the usual practice very closely. Of course small deviations from this rule can be easily compensated by slight inclinations of the projector aperture against the horizontal. But with screens according to the co-pending application it is also possible to change the apparent length of the theatre, by focusing the film not on the screen, but on a plane before or behind it. Apart from the simpler projector, the system of inclined lenticules has another advantage. Screens according to the copending application have a horizontal line structure. Therefore this structure, even if it is not visible in itself, might give rise in combination with a film with horizontal lenticules to the appearance of a periodic pattern. This is automatically avoided by a suitable inclination. From considerations of optimum definition, $\tan \beta = 0.2-0.25$ appears to be particularly suited.

Figure 12:
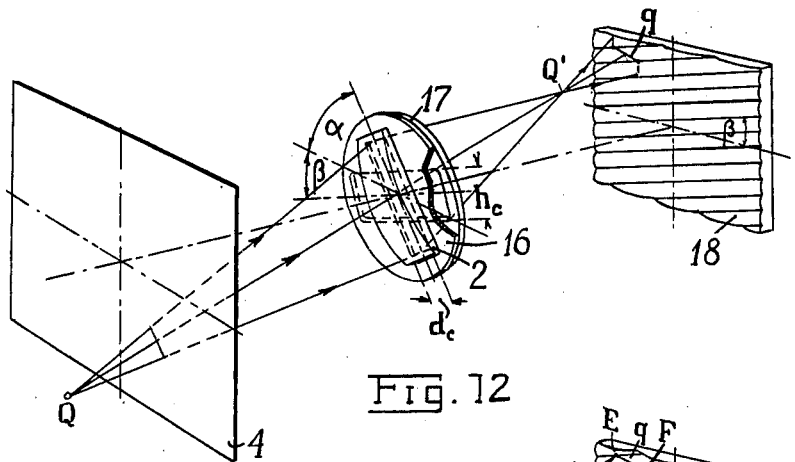
Figs. 12, 13 and 14 show in turn the taking, printing and projection of stereoscopic pictures in the preferred case in which the lenticules of the film include an angle with the horizontal chosen in such a way that said pictures can be projected with correct lateral and longitudinal magnification with a horizontal projector slit.
Figure 13:
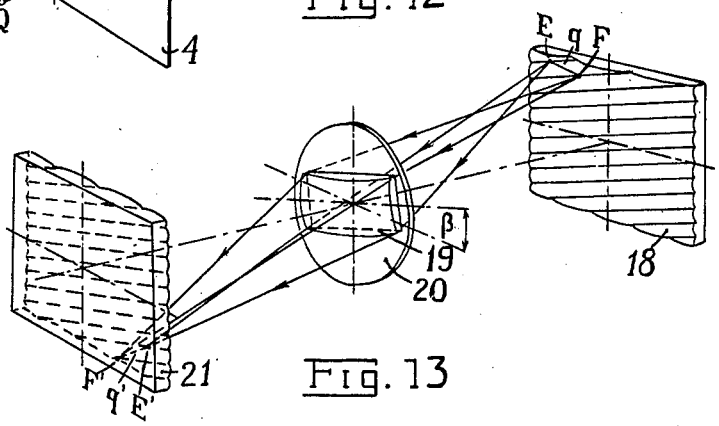
Figure 14:
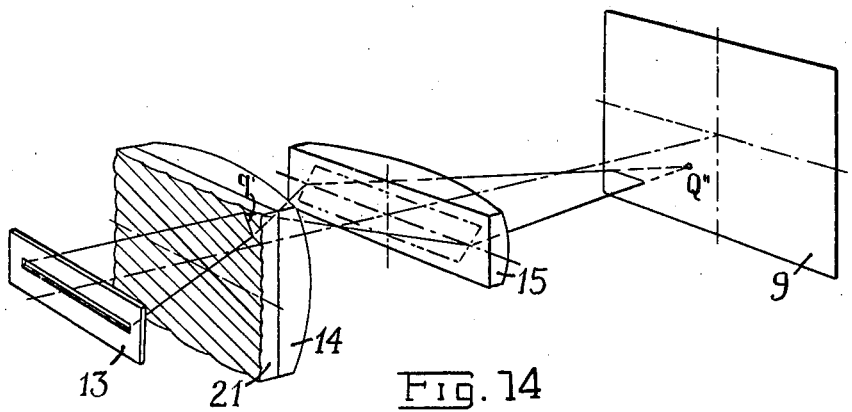

Figs. 12, 13 and 14 illustrate in turn the taking, printing and projection of pictures on films with inclined lenticules.

In Fig. 12 the lens 2 of the camera can be turned together with a diaphragm 16, fitted with a slit-shaped aperture, before a frame 17, with a square aperture parallel to the lenticules, i. e. inclined at an angle $\beta$ against the horizontal. The inclination of the slit against the horizontal is again $\alpha$, its angle with the lenticules is $(\alpha+\beta)$. The lens forms a sharp image of the "first plane" 4 on the rear face of the lenticular negative film 18. It is shown in the figure how a point Q is imaged in the emulsion as a straight trace $q$. In order to make the drawing simpler this is shown on the front, not as it really is, on the rear face of 18. Seen from the camera, the point Q appears near the bottom left corner of the frame 4, and behind it. It will be shown that after printing and projection the spatial image of Q will appear on the projection screen in a corresponding position.

Fig. 13 is a schematic illustration of the printing process. The negative film 18, developed and fixed, is placed opposite a lens 19 and illuminated from behind. A square frame 20 is fixed in the same position relative to the film as the frame 17 in the previous figure, but no slit is used. The lens 19 images the emulsion of the negative film 18 on the emulsion of the positive film 21, which is embossed with lenticules parallel to those of 19. This means that the lenticules of the negative and of the positive stock must have equal but opposite inclinations. It is assumed, in order to simplify the explanations, that the lenticules of the positive and negative films register exactly, in the sense that every lenticule of 18 is imaged on one of 21. It will be shown later that this condition is not strictly necessary. It has been assumed that the lens of the printer assumes the same position relatively to the negative as the lens of the camera in which it was taken. It will be shown later how negatives taken with different focal lengths $f_c$ can be printed in a printer of standard focal length. If we abstract from the lenticules, and compare the original and the print as both appear when seen from the lens, we can express the transformation by saying that "up" and "down" have been reversed by the printing, but not "right" and "left." The lenticules do not affect the images in their own direction, but each one reverses the images within its own zone. Taking e. g. the upper end of E of the trace $q$ in the negative film, this will be imaged on the lower edge of the lens aperture, and this again on the lower edge of the zone of the corresponding lenticule of the positive film, in a point E'. Seen from the lens the positive trace $q'$ is inclined against the lenticule axis in the opposite way as the negative trace $q$, in other words the printing process has interchanged "before" and "behind."

In Fig. 14 the positive film has been turned upside down and is facing the other way than in Fig. 13. It is illuminated by a horizontal slit 13. A lens 14 images the slit 13 on the main or projecting lens 15, which in turn images the film on a projection screen 9 according to the co-pending application. The result is that a spatial image is formed of the trace $q'$, in the same relative position to the projection screen 9, as the original point was in Fig. 12 relative to the frame 4, i. e. near the bottom left corner, and behind the screen. The reproduction will be correct if the Eqs. 3 and 4 are observed. These equations remain valid if the lengths D and h are always measured in the direction of the lenticules resp. at right angles to them.

Projectors according to the scheme shown in Fig. 14 have the slight disadvantage that the light is dispersed by the lenticules at right angles to their axes, i. e. not vertically, as shown by the lozenge-shaped illumination on the lens 15. This entails a certain loss of horizontal definition, which however can be reduced to insignificant proportions.

Figure 15:
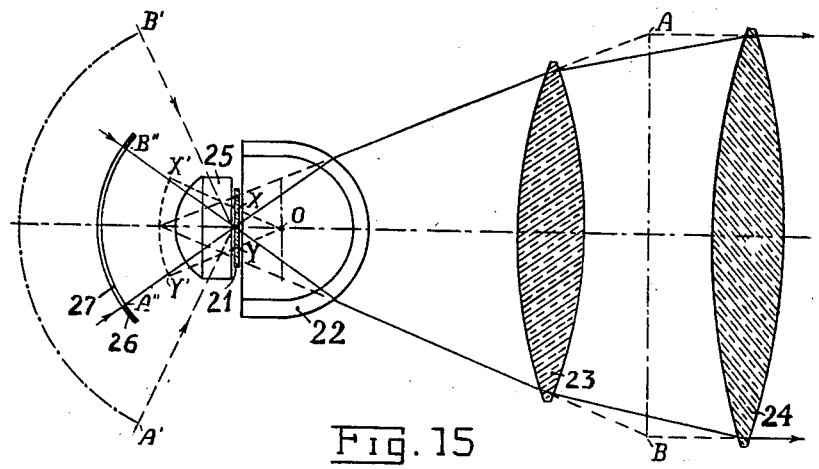
Figs. 15 and 16 are plan and elevation of a system of projection optics according to the invention, with large horizontal aperture.
Figure 16:
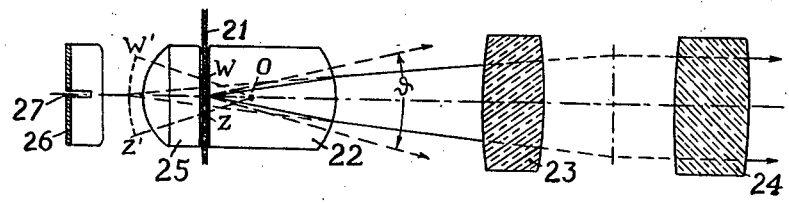

In the previous figures the optical systems used in the projectors were shown only in a schematic way. These systems present however special problems because of the large aperture width required. According to the "Sine theorem" of Abbe, a lens system with a focal length $f$ giving point-to-point reproduction can never have an effective aperture width D larger than $2f$. By immersing the film into a liquid with a refractive index $n$ this could be increased to $D_{max}=2nf$. But immersion of films is generally difficult, and in the case of lenticular films it would destroy the effect of the lenticules. Therefore $D_p=2f_p$ is the theoretical limit, and as in most cinema theatres using 35 mm. film the focal length of the projector is 100 mms. or little more, the limit for $D_p$ is 200 mms., or little more. $D_p$ could be immediately increased if a larger standard would be adopted for stereoscopic films, but this would forbid the use of ordinary films in the same apparatus. In Figs. 15 and 16 an example of a projector system is given, with which the theoretical limit $D=2f$ can be very closely approached.

Figs. 15 and 16 show plan and elevation of a projector system which corresponds to the schematic arrangement in Fig. 4. The film 21, with its goffered side to the left passes very close to a spherical lens 22. The film emulsion passes through the so-called "aplanatic point" of the spherical lens 22, i. e. at a distance $r/n$ from its centre, if $r$ is the radius of the lens and $n$ its refractive index. These points have the property that they are imaged without spherical aberration at a distance $n.r$ from the centre, and that a small area around them is imaged without distortion by rays including any angle with the axis. The image would be perfect if the film could be spherically curved around the centre. If it is plane—as assumed—the image X'—Y' will still have nearly spherical curvature, but with a radius larger than $n.r$. The magnification from the film frame X—Y to the virtual upright image X'—Y' is $n^2$. In the drawing $n=1.55$ has been assumed, the magnification is therefore 2.4. The divergence of the illuminating beam has been correspondingly reduced. This makes it possible to use a lens system 23, 24 with moderate angular aperture for the projection on the screen. If e. g. the screen is at a distance of 40 meters and a linear magnification of 400 is desired, the resulting focal length of the whole system must be 100 mms. But as the lens 22 magnifies already 2.4 times, the lens system 23, 24 can have a focal length of 240 mms., and a diameter of 200 mms. This diameter will be fully utilized according to the "Sine theorem" only if the film is illuminated in the horizontal plane within a full angle of 180°. But even with an illumination angle of only 130° the aperture is almost fully utilized. It is therefore possible to approach the theoretical limit of $D_p$ very closely. As shown in Fig. 16, only slabs of the lenses 23, 24 are needed. The lens 22 reduces the original divergence $\vartheta$ also in the vertical direction. Assuming—as in the previous examples—an effective lenticule aperture of $f/2$, the height of the illuminated zone of 24 will be only about one fifth of its horizontal width.

It might appear that the lens system 23, 24 with an aperture ratio of $f/1.2$ still presents considerable practical difficulties. As however this projection system is intended to be used in conjunction with screens according to the co-pending application, the lens need be corrected only to a very much smaller degree than a similar lens used with an ordinary screen. The ordinary— diffusing—projection screen takes a section through the beam corresponding to one point, and shows up every aberration. On the other hand, a screen according to the co-pending application is an optical imaging system. The difference between the two cases can be understood in a general way from the fact that in the first case the eye sees the patch in which the beam has struck the screen surface, whereas in the second case the rays are not diffused but reversed, and the eye picks out only those rays which enter the pupil. These however are rays which have left the projector lens in a narrow zone, corresponding to the width of one pupil. In other words, whereas in the case of a diffusing screen all zones of the projector lens have to co-operate for creating a sharp image on the screen, in the case of an imaging screen the image of any spatial point seen by any individual observer results only from the intersection of the rays of two narrow zones of the lens, each zone having the width of the eye pupil and a distance equal to the eye distance. From this consideration it follows that spherical aberration, astigmatism, coma and field curvature of the projection lens might impair the depth reproduction to some extent, but they will not substantially affect the definition. Only chromatic aberration will have to be corrected, at least if it is desired to show pictures in natural color.

Achromatic projecting systems with the desired large apertures can be easier constructed with the use of reflecting elements. In particular spherical mirrors in combination with refracting compensating plates known as "Schmidt-plates" can be made with focal ratios as high as $f/0.6$ and are achromatic to a very high degree.

As explained in connection with Figs. 11 and 14, the aperture A—B of the projector lens must be an image of the illuminator slit, and vice versa. Constructing in Fig. 15 the image of A—B backwards through the lens 22, we obtain the curved image A'—B'. In this figure the radius $r$ of 22 has been appropriately chosen in such a way that A'—B' centers approximately around the centre of the film frame. We could therefore place the illuminator slit into A'—B'. But it is preferable, as shown in the drawing, to use a condenser lens 25 with a spherical curvature, centering around the centre of the film frame. This images A'—B' in A''—B'', which is again circular with the same centre, but has a radius and an opening angle reduced in accordance with the refractive index of 25. At A''—B'' a curved sheet 26 is fitted, with a slit 27. This slit has to be illuminated in such a way, that little light is lost from the light source, and as much as possible of the light passing through the slit will pass also through the film frame.

Figure 17:
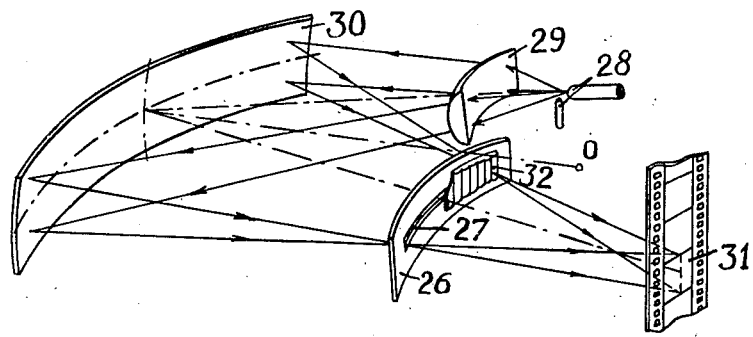
Fig. 17 is a perspectivic view of an illuminator system according to the invention, which allows utilizing almost the full radiation of the light source for projection.

Fig. 17 shows an illuminator system according to the invention, which fulfils these requirements. 28 is an arc lamp, which may be considered as a point source. The light of the arc passes first through a toroidal lens 29, and is subsequently reflected on the spherical mirror 30, with a centre point O. The toroidal lens and the spherical mirror are so adjusted, that a horizontal circular caustic is formed on the slit 27, which centers around the film frame 31. A second vertical caustic is formed in the plane of the film frame, of a length substantially equal to the height of the frame.

In the arrangement as so far described only one vertical zone of the frame would be illuminated. This can be overcome by a horizontal linear source instead of the point source 28. If a point source is used, suitable light distribution is obtained by a vertically goffered film or glass plate 32, covering the slit, which is so dimensioned that the caustic is broadened into a square cross section of the beam, preferably coinciding with the frame 31.

In order to obtain the light distribution as described, the light source 28 and the film 31 must be arranged in such a way, that in the absence of the toroidal lens the spherical mirror would image the arc on the film. The toroidal lens interferes with this homocentric bundle of light by producing the two caustics, of which the second will pass through the original image of the point source.

The system as described is the simplest fulfilling the above stated requirements. It can be further improved by introducing a condenser lens, as in Figs. 15 and 16.

The distance of the slit 27 from the frame 31 must be the same as the standard distance of the printing lens from the negative in the printing process. If it is more convenient to place the slit at a different e. g. smaller distance, this can be corrected by a cylindrical lens with an axis parallel to the lenticules placed close to the lenticulated side of the film.

Figs. 18–22 contain illustrations of new methods by means of which the aperture width $D_p$ can be extended beyond the theoretical limit $2f_p$ imposed by the Sine theorem. This is made possible by the addition of optical elements, to be called "afocal plates."

Fig. 18 is a section of an afocal plate as known in itself. It consists in a plate or sheet 33 of transparent material embossed on both sides with registering cylindrical impressions. Of these one set consists of convex gofferings 34, and the other of concave flutes 35. The curvature radii of said impressions are adjusted to one another and to the thickness of the plate in such a way that their "inner" focal lines—which appear in Fig. 18 as points $F_1$—coincide. Consequently parallel beams of light falling at right angles at the convex lenticules 34 will leave the plate again as parallel beams at right angles to it. Parallel beams will leave the plate also as at least approximately parallel beams if their incidence angle $\alpha_1$ is smaller than a certain limit. But the angle $\alpha_2$ at which they leave the plate will be larger than $\alpha_1$. We obtain approximately $$\alpha_2 = (-f_1/f_2)\alpha_1 \qquad \text{Eq. 9}$$

It can be seen in Fig. 18 that the factor $(-f_1/f_2)$, which we will call $\nu$ is larger than unity. If now we consider the lenticules and the plate thickness as very small we see that the afocal plate behaves dioptrically in the same way as a plane boundary between two media, of which the one at the right has a refractive index of unity and the one at the left a refractive index $\nu$. Looking from the right at an object at the left of the plate, it will appear as if immersed into a medium with a refractive index $\nu$. This remains true so long as the object and the observer are at such large distances from the plate that the individual lenticules remain invisible, and so long as the incidence angle remains so small that the departure of the focal surfaces of 34 and 35 from one another is unnoticeable, and no beam splitting occurs. Beam splitting will occur for illumination from the left only beyond a certain angular limit, but for illumination from the right for all angles of incidence. It is proposed to use the plates only as illustrated, with the convex side towards the light.

Simple afocal plates as shown in Fig. 18 and as known in themselves can be used only for narrow angular fields. The focal surface of a simple lenticule is cylindrical, centering around the axis of curvature of the lenticule, and as the lenticules on both sides have different axes, the focal surfaces can not coincide except for rays very near to the perpendicular. Fig. 19 shows an improved type of afocal plates, in which the focal surfaces $\varphi_1$ concide over a wide angular range. This plate consists of two sheets, 36 and 37, of which the second has a refractive index $n_2$ larger than the first $n_1$. The focal surface of e. g. a lenticule 34 is circular-cylindrical in its own medium $n_1$, but after refraction at the boundary between $n_1$ and $n_2$ it becomes elliptically cylindrical in the second medium $n_2$. If the apex of this ellipse is made to coincide with the apex of the circular focal trace of the lenticule 35 in the medium $n_2$, and their curvatures in said apex are also made equal, the apparent refractive index of the plate becomes:

$$\nu = n_2/n_1 \qquad \text{Eq. 10}$$

In order to make this large, $n_1$ and $n_2$ must be made as different as possible. Afocal plates made of transparent plastic materials are particularly preferable, both for the ease with which they can be moulded and for the wide range of refractive indices which they offer. The smallest refractive index hitherto realized with transparent plastics is 1.46 (ethyl-cellulose), and the largest 1.9 (certain plastics of the urea-formaldehyde type). With these we can produce $\nu=1.3$. Higher apparent refractive indices may be obtained by using several afocal plates according to Fig. 19 in succession. If e. g. three are used, their combination will be equivalent to $\nu=1.3^3=2.2$.

By means of these afocal plates we can now exceed the limit $2f_p$ for the aperture width $D_p$ and approach the limit $2.\nu.f_p$, i. e. produce the same effects as if the film were immersed in a liquid of the refractive index $\nu$. How this may be done is illustrated in Figs. 20–22.

In order to understand Fig. 20 it may be useful to explain first how the aperture width could be enlarged in the case of ordinary flat films. By a first lens system an enlarged image of the film could be projected on a ground glass screen, and this could be projected with further magnification on the projection screen. It is obvious that by this method apertures of any size could be realized. But this method can not be used in the case of films in relief, as in this case a coordination must exist between the different views recorded in said film and the projection aperture, in the sense that every view must be projected only through a point or a vertical zone of said aperture. This co-ordination would be destroyed by a ground glass screen. But the co-ordination can be preserved if according to the invention an afocal plate is substituted for the ground glass screen. This is illustrated in Fig. 20.

Fig. 20 is a diagrammatic plan view of a projection system, which differs from the ones illustrated in Figs. 11 and 14 in that new elements have been added. The film is shown as an arrow X—Y, the illuminator slit as a double arrow W—Z. The function of the lenses 14 and 15 is the same as in Figs. 11 and 14, i. e. 14 produces an image W'—Z' of the slit W—Z on 15, and 15 produces an image of the film. But in this arrangement the film image X'—Y' is not projected on the screen but on an afocal plate 33, with an intermediary magnification $m$. The plate 33 is backed by a further lens 38, and this is followed by the final projection lens 39.

Without the afocal plate this arrangement could not have a larger final aperture than $D_0$, which could be also obtained without the additional lenses 38 and 39 at the same final magnification. The divergence of the rays would decrease in just the same proportion as the intermediary magnification increases. But the afocal plate makes the slit image W'—Z' appear nearer to 38 in the proportion $\nu$—in the drawing I have assumed $\nu=2$—and of this image W''—Z'' the lens 38 prdouces a final image W'''—Z''' on 39, of a width $D_p=\nu D_0$.

Actually the gain obtainable by the addition of the new parts is not quite $\nu$, but only $\nu m/(1+m)$, where $m$ is the intermediary magnification. The reason is that if the lens 15 does not project at the projection screen, which is practically at infinity, but has to form an intermediary image nearer to it, the lens will have to be placed at a somewhat greater distance from the film, and the angular aperture will be reduced in the ratio $m/(1+m)$. Therefore the intermediary image has to be made rather large. This has the advantage that it is easier to construct a large afocal plate with lenticules relatively so small that no details of the picture are destroyed, but it has the disadvantage that the resulting optical system will be rather long. The length can be reduced by using a concave mirror instead of the final lens 39.

The arrangement as described has the advantage that the afocal plate need not be a very perfect optical system. As the image of the film is produced directly on or in it, it will not interfere with the imaging of the film itself so long as the lenticules are sufficiently fine. It will have to image merely the slit, and closer investigation shows that even aberrations of the order of a few degrees will not destroy the definition.

Figs. 21 and 22 show diagrammatically plan and elevation of another arrangement, in which the afocal plate is used for imaging the film itself. These drawings do not contain the optical elements for imaging the illuminator slit on the final aperture, these may be understood to be of the same nature as previously explained. The afocal plate 33 is arranged in these figures near an astigmatic lens 40, which has a longer focal length in the plan than in the elevation. The plate itself is preferably curved as shown. This has the advantage of reducing the incidence angles and by this reducing the aberrations and preventing beam splitting. The plate is followed by the final projection lens 41, which in this case is a cylindrical lens with vertical axis. It may be advantageously replaced by a cylindrical mirror.

As the system is astigmatic the rays must be separately traced in plan and elevation. In the plan view—Fig. 21—the lens 40 produces of the film frame X—Y an upright virtual image X'—Y'. Of this the afocal plate produces an approached image X"—Y", and this is finally imaged by 41 on the screen.

In the elevation the afocal plate 33 and the cylindrical lens 40 are inactive. The lens 40 produces the final magnification by itself. The distances and refractive powers of the elements have to be adjusted in such a way that the magnifications become equal in the horizontal and in the vertical directions. The gain which can be produced with this system is also nearly $v$, and it has the advantage of shorter total length.

As has been explained above, $v$ can be made 2 or even more by using several afocal plates in succession. With the systems as described it is therefore possible to produce projector apertures of the order 300–350 mms. or even more in cinemas of the usual size, using the ordinary 35 mm. film.

Although lenticular films have been proposed a long time ago for cinematography in natural colors, their widespread use was prevented mainly by the difficulties of printing. Contact printing or continuous printing by projection rule out altogether, but even step-by-step printing by projection, as shown in Fig. 13 presents difficulties due to the impossibility of perfect registering of the lenticules in the positive and negative film. Imperfect registering results in a loss of definition, as explained in Fig. 23.

In this figure, which corresponds to Fig. 13, 18 is again the negative film, which is projected by means of a lens 19 with a focal length $f$ on the positive film 21. The lens has to fulfil the aperture condition according to Eq. 1, but as its distance from the film is $2f$, this length has to be substituted for $f_c$ in Eq. 1. This ensures that if the negative film is illuminated from behind, every point Q in the emulsion of the negative film will be printed in corresponding points in the zones of the positive film. But if the two films do not register it will generally happen that the beam leaving one lenticule of the negative enters into the positive film through two lenticules, and produces a print of the original point in both zones. The intensity of the two points, Q' and Q" will be in the same ratio as the width of the beams, i. e. corresponding to the displacement of the two films relative to one another.

The result is therefore a loss of half the vertical definition. It will be shown that by a suitable modification of the printing process, in conjunction with the other essential features of the invention, this deficiency can be almost entirely eliminated.

Fig. 24 is a diagrammatic illustration of the illuminator system used in the printing process according to the invention. A linear light source 42 is used, e. g. an incandescent lamp with a straight filament, and a cylindrical condenser system 43, which in the absence of the film would project a linear image of 42 into the centre C of the lens 19. Every point of the emulsion receives only a narrow fan of rays, at right angles to the plane of the drawing, which appears in the drawing as a single ray. Talking for simplicity of rays and points, as they appear in the drawing, it can be seen that every point of any lenticule surface will receive a ray from one point of the corresponding zone in the emulsion, and from one point only. This follows from a proposition, which can be deduced from Eq. 1, that the zones can be constructed as projections of the lenticules from a point C' at a distance $2nf$ from the film.

In the above explanation it has been tacitly assumed that the distance $2f$ of the printer lens 19 from the negative 18 is the same as the distance $f_c$ of the camera lens during the taking of the picture. In general however $f_c$ will be variable, it will be chosen short for "close-ups" and longer for outdoor pictures. On the other hand the focal length $f$ of the printer ought to be a standard length. The variations of $f_c$ can be compensated in a similar way as in Figs. 8 and 9, by introducing a suitable thin cylindrical lens close to the lenticular surface of the film, parallel to the lenticule axes. This must have such refractive power that seen from the film the printer lens 19 appears in the same position as the camera lens was when the picture was taken. This ensures that all zones will be correctly imaged on the pointer lens. In addition it is however also necessary to modify the illuminator system 43 in such a way that in the absence of the film it would form an image of the filament at the distance $f_c$. The focal length with which it was taken has to be marked therefore on every length of film and a set of correcting lenses kept in readiness. The positive film printed in this way will have its image zones in the correct position for use in standard projectors, i. e. projectors with an illuminator distance equal to the standard length $2f$.

Fig. 25 shows the application of the process described to the printing of a trace $q$ corresponding to a spatial point. In order to simplify the drawing, the rays by means of which the printing is effected are not shown as converging towards a point C', as in the previous figure, but parallel to the system axis. This simplification is irrelevant for the results. It can be seen that the lenticules of the negative and positive film do not register, in the sense that if one surface is projected on the other, the dividing lines will be shifted relative to one another by a fraction $\epsilon$ of the period $\lambda$. The traces $q$ and $q'$ are shown as they appear if seen from the rear of the negative and the positive respectively. Therefore "up" and "down" are interchanged but not "right" and "left," and the traces in the negative and in the positive appear inclined in the same sense.

The print $q'$ can be constructed from $q$ point-by-point, but more simply as follows: First the extreme rays, i. e. the rays starting from the extreme ends of the trace $q$ are constructed. This gives the lenticules in the positive film which take part in the reproduction of $q$. Their number, and therefore also the number of zones occupied by $q'$, will be always one more than the number of zones occupied by $q$, except in the case of perfect registering. In these zones we can immediately draw the diagonals, and we can also immediately transfer from $q$ the vertical dividing lines, which divide up the trace in straight sections. These will be at the same distance, e. g. from the right in the print as in the original, as "right" and "left" are not interchanged if we look at both films from the emulsion side. But there will appear in the print $q'$ one more vertical dividing line than in the original $q$. We can construct this by projecting the zones of the positive on the zones of the negative. This is carried out in Fig. 25 by means of the straight lines through the lens centre. It is seen that one, and only one, of the dividing lines of the zones of the positive, projected by a ray "$d$" will cut across the original trace $q$. The trace $q'$ will be split in the reproduction in a corresponding vertical line, which is at a fraction $\epsilon$ of the total horizontal width $y$ of the trace, measured from the right end. The splitting has the effect, that the parts of the trace which in the original are at the left of said vertical dividing line, will be in the reproduction shifted downwards, by a full period $\lambda$.

These results can be expressed in a much simpler form if we consider the spatial reproduction by projection of the image $q'$. This is shown in Fig. 26. It can be seen that instead of one point there appear two, $Q'$ and $Q''$, both at the same distance from the projector, but shifted relatively to one another by a distance $\lambda L/f_p$, or in other words, shifted by one line. One of these points, $Q'$, is projected only through the left part A—S of the projector aperture, the other, $Q''$, through the right part S—B, which is in the same ratio $\epsilon$ to the whole aperture width D, as the relative displacement of the two films during the printing process to the period $\lambda$.

If this spatial image is projected on a screen according to the co-pending application, every member of the audience will see the same spatial figure. To explain this we can use again Fig. 26, only this time A—B may not mean the projector aperture but one of its images in the audience, i. e. a zone of binocular vision for any one member of the audience. Therefore, if both eyes of the observers are at the left of S, on A—S, he will see $Q'$ with both eyes. If both eyes are on S—B, he will see $Q''$. If one eye is at the left of S and the other at the right, one eye will see $Q'$ and the other $Q''$. But even in this case the observer will see a perfectly well-defined spatial picture. The effect will be as if in the method of stereoscopic projection with selective spectacles the pictures destined for the right eye and for the left eye were vertically shifted relatively to one another by a very small amount. It will be instinctively compensated by a very small tilt of the eyes relative to one another.

Therefore if the positive and the negative fail to register in the printing process as described above, the effect on the definition will be nil, except if the dividing point S coincides with one eye. Assuming that this division is sharp, the probability of its coinciding with an eye is expressed by the ratio of the pupil width to D. Assuming the pupil to have a diameter of 4 mms. and $D=200$ mms., the probability for one eye is 2% and for both eyes 4%. Therefore even if the divisions of the positive and negative films are unequal, so that the point S wanders about on A—B, a slightly blurred picture—with half the vertical definition—will be seen only during 4% of the time and always by one eye only, whilst the other eye continues to see the picture with full definition. The divisions must not be however very unequal, or else S will move about so rapidly that the eyes will have difficulty in adjusting themselves.

A certain disturbance of the definition can occur also if the lenticules of the negative and positive films are not exactly parallel during the printing process. This is illustrated in Fig. 27. The two systems of zones when projected on one another intersect in a line O—O', which halves the obtuse angle between them. If we draw lines X—X' parallel to O—O' there will be a constant displacement $\epsilon\lambda$ of the two rasters along this line. An eye brought into a corresponding position S—Fig. 26—will see a certain "break" of the picture along this line, the two halves of the picture will appear displaced at right angles to the lenticule axes by a small distance corresponding to the period $\lambda$. This deficiency can be already much reduced, if only one eye can see such a break at a time. This is assured, if the two lenticule systems include such a small angle, that they diverge on a length within one frame by less than the distance corresponding to the eye spacing. Assuming e. g. $D_p=200$ mms. and a normal eye distance of 65 mms., or one-third of $D_p$, a frame width of 20 mms. and 20 lenticules/mm., this means that an angle between the two systems must be less than $$1/3 \times 20 \times 20 = 1/1200, \text{ or } 3'$$

This is no extraordinary precision, it can be easily maintained during the printing process, especially if the films are made to move continuously, and the optical system is made to follow them during the printing period, whilst stepping back during the change from one frame to the next. If the above calculated small divergence is maintained, two eyes can never simultaneously see a "break" in the picture, and at the same time we have assured that any single eye can see a "break" in the average only once in every 3 pictures. By more precise adjustment the effect can be further reduced.

If therefore reasonable care is taken to keep the lenticules of the two films parallel during the printing process as described, there will be hardly any noticeable loss of definition if the two films fail to register.

Stereoscopic pictures in natural colors can be taken on principle with any additive or substractive method known in itself, with the exception of substractive methods in which both sides of the film are used, and with the exception of the oriignal method of color cinematography by means of lenticular films. The reason for the last mentioned exception is that if, as usual, filter bands were used which are reproduced as sub-zones in the emulsion, and the film projected through corresponding filters in the projector aperture, every eye in a certain position would see the picture permanently in the same colour. It is, however, possible to modify the original method by using rotating or alternating color filters. This may be explained in connection with Figs. 28 and 29. In order to simplify the explanations we take two-color photography as an example.

Fig. 28 shows the positions of the rotating color-filter in relation to the taking slit 3 of the camera corresponding to two consecutive film frames. These form a complete cycle. In the case of three color photography three frames would form a cycle. In Fig. 28 the sector 44 may be e. g. blue-green, the sector 45 red-orange. Every half-zone in the film will therefore alternatingly correspond to blue-green and to red-orange. If the projector is fitted with a similar rotating filter, every eye in the audience will see in rapid alternation blue-green and red-orange pictures, and these will produce the impression of natural colors.

This system has however the disadvantage, that it requires a rotating or oscillating filter in the projector, which must move in step with the camera filter in order to produce the right sequence of colors. This inconvenience can be avoided if, according to the invention, the subzones in the positive film are themselves coloured in the right way. This may be explained in the example of two-color pictures in connection with Fig. 29.

In this figure 21 is again the lenticular positive film, which is coated on its back with a double layer. The first layer, 46 is an ordinary finegrained emulsion, whereas 47 may be a layer of bichromated gelatine, dyed e. g. blue-green. This film is first printed in the ordinary way, as explained in connection with Figs. 13 and 24. During the printing the bichromated gelatine is little affected, as its light sensitivity is much smaller than of the emulsion, especially if blue and shorter wavelengths are excluded during the printing process. The film is now developed and fixed, and sent a second time through the printer, which is fitted with an oscillating or rotating shutter 48, which assumes in consecutive frames alternatingly the positions shown in continuous and in dotted lines. This time however no negative film is used, but the bichromated gelatine is merely exposed in strong light through that half of the lens which the shutter leaves free. The shutter moves in such a way that in every frame it exposes only that half of the zones which were taken through a blue-green filter in the original. By the strong exposure the gelatine in the half-zones 49 hardens so much that it does not absorb water. The unexposed zones 50 are now bleached and dyed red-orange. They can be also hardened subsequently by light or by tanning. The film so prepared can be projected in the ordinary way, without any shutters or filters. In the above description bichromated gelatine has been given only by way of an example, it can be replaced by many other substances known in themselves which change their physico-chemical properties under strong exposure, and admit or refuse dyes. The method can be extended also to three-color photography, in which case the negative film is sent twice through the printer after the printing of the picture itself. It may be noted that in the process as described the definition remains unimpaired, as the dyed filter zones are arranged behind the emulsion.

The reproduction of stereoscopic animated cartoons requires a new technique. It is of course possible to make small-scale models instead of drawings, and photograph them with the method as described. But this considerably restricts the freedom of the artist. It is difficult e. g. to change the expression in the face of a character and it is generally more difficult to show apparent physical impossibilities, which constitute the best cartoon-effects, if three dimensional models are used instead of drawings. In the process according to the invention to be described, the stereoscopic film is produced by a method which from the point of view of the artist is very nearly equivalent to drawing a cartoon.

Fig. 30 is a sectional elevation of the apparatus for producing stereoscopic animated cartoons. It consists of a box 51, with a horizontal slit 52, before which there is arranged a suitable lens 53 through which the animator looks into the box with both eyes. The slit and the lens must have therefore a horizontal width larger than the eye spacing. Opposite the slit 52 a window is cut into the box, and in this window is fixed a lenticular plate 54, preferably of glass, of e. g. ten times the size of a film frame. The lenticules are inclined under a certain angle against the horizontal. To the back of said plate is fixed a thin sheet of light sensitive film or translucent paper, with the sensitive side outside. This paper or film is preferably glued to the plate 54 with a transparent glue. It need not be taken off until the whole process is finished.

A sheet 55 of transparent material which may be dyed e. g. yellow is freely movable before the lenticular plate, but so as to remain parallel to itself. This is fitted with a small hole 56, which in this apparatus plays the part of a pencil. The plate 55 with the hole 56 can be moved by the artist, either directly, or by means of a pantograph or the like.

Between the viewing slit and the lenticular plate is arranged a semi-transparent mirror 57, at an angle of 45° against the horizontal. This may be realized e. g. as shown by means of two prisms, one of which is transparently metallized, united so as to form a cube. Vertically above this, in such a position that it coincides with the image of the slit 52 in the mirror 57 is arranged a second slit 58, of the same length as the first, although not necessarily of the same width. This is backed by a suitable filter 59, which can be made of ground glass, and which is illuminated by the light source 60, through a condenser 61. The light source, the light sensitive material and the two filters 55 and 59 must be matched as follows: The light source must emit rays for which the paper or film is sensitive. The sheet 55 must cut out all rays for which the paper or film is sensitive, which have passed through 59, but it must transmit at least some kind of visible light. As an example we assume that the film or paper is sensitive in the blue. In this case 59 may be a blue filter, which cuts out all longer wavelengths, and 55 is yellow, which cuts out the blue, but allows to see the picture behind it in green, yellow or red light. It is even better to choose a paper or film which has appreciable sensitivity only in the ultraviolet, and a high-pressure mercury lamp as source, with a "dark-ultraviolet" filter 59, which transmits only the near ultraviolet. By this we avoid seeing the glare of the lamp on the sheet 55, which may be made of any transparent material which cuts out the ultraviolet. With this arrangement actinic light will be transmitted from the light source to the film or paper only through the hole 56, whilst at the same time it is possible to see the drawing in natural colors.

With the arrangement as described it is possible to "draw" spatial pictures, using the hole 56 as a pencil, and varying the intensity of the illumination with a switch or a variator. This is explained in Fig. 31. As the slit 52 is the mirror image of the illuminating slit 58, the rays will appear as coming from 52. The rays passing through the slit will therefore produce on the light sensitive paper an image of the hole 56, in exactly the same way as explained in connection with Figs. 2 and 4. The difference is only that instead of forming as in Figs. 2 and 4 an image C' of a spatial point C by means of a lens, we produce immediately a point C' by putting the hole 56 in its place.

If now we use a light sensitive material—such as ordinary photographic paper—which immediately blackens when exposed, and shine light through 54 from the back, we will see a spatial image of the hole appearing at the same spot. It is therefore as if we had made a dot floating in free space. Care must be taken of course not to destroy the picture by illumination. Therefore during the drawing only such light must be used for observation which does not contain actinic rays. After fixing the picture may be observed in any light. It is preferable to use photographic material which can be fixed in a "dry" process, such as diazo-compounds, to avoid wetting and distortion of the film or paper glued to the lenticular plate.

As the cartoon made in this way, although considerably larger than the film frame, is still much smaller than the picture which we want to project on the screen, it will appear in a very compressed relief. The plane corresponding to infinity will be at or preferably near to the embossed surface of the plate 54, the plane eventually corresponding to the projection screen at some distance $\Delta_s$ before it. From the same considerations which led to Eq. 2 it can be shown that if the cartoon is $m$ times larger than a film frame, the total depth $\Delta_s$ of the relief will be $$\Delta_s = m^2 f_p^2 / L \qquad \text{Eq. 11}$$

It has been already noted in connection with Eq. 8, that in all cinema theatres in which true spatial reproduction of the same film is possible, $$f_p^2/L$$

must have the same value. Assuming $m=10$, i. e. a cartoon ten times larger than a film frame, $f_p=100$ mms., $L=40$ meters, we obtain $\Delta=25$ mms. We can therefore draw a scene of any depth, even extending to infinity with a longitudinal movement of the sheet 55 of only 25 mms. In order to make it easier for the animator to fix longitudinal dimensions accurately, it may be preferable to derive the longitudinal movements of 55 from the hand of the animator by a reducing gear.

In order to be able to control by eye the longitudinal dimensions, the picture is viewed not directly but through the lens 53, which shows an enlarged, and, according to the general law of optical reproduction, more than proportionally deeper view of the spatial image. If it is desired to see the image exactly as it appears from e. g. the middle seats of the audience, near the "perspectivic point" two conditions must be fulfilled by the lens 53. It must have its focal plane coinciding with the plane which has eventually to appear at infinity, and its focal length must be so, that 54 appears from the lens at the same visual angle as the screen from the said seats. The apparatus can be kept shorter if instead of a single lens as shown compound lenses are used, in the manner of an inverted teleobjective. If these conditions are fulfilled, it will appear to the animator looking through 53, that he is building up the scene in space in natural proportions.

In animated cartoon films a very large number of frames are needed for showing a small movement. It would be very uneconomical to draw a new cartoon for each. Therefore the box in Fig. 30 has a second window at right angles to the other, and of the same size, containing a second lenticular plate 62, opposite to a mirror 63, at 45° to the horizontal. The mirrors and windows are arranged in such a way that the image of 62 seen after double reflection in the two mirrors 63 and 57 coincides exactly with the image of 54, seen directly. The plate 62 must be turned on its side, as lines which are vertical in it will appear horizontal when viewed through the two mirrors. This second plate carries glued to its back a drawing of the background and of all parts which it is not desired to change during a certain sequence. Those parts of the background which are covered in the scene by objects or persons must be masked out, and the visible parts of the background must be masked out in the new cartoon. Masking in the case of stereoscopic pictures is of course not geometrically exact, as in the case of flat pictures. It may be therefore necessary to mask out also parts of the background, which are invisible only for extreme positions of the eye, and to redraw them partially in the new cartoon.

Masking may be done by placing a thin transparent sheet of e. g. Cellophane over the background cartoon, and blacking out with ink. The mask for the new cartoon is made by taking a contact print of said mask, which will be a negative of the first. Only the changes are drawn, and finally the new cartoon and the background are photographed together. This is done by removing the sheet 55, shining light of appropriate intensity through both drawings, and placing before the lens 53 a cinematographic camera of a design suitable for taking stereoscopic pictures according to the invention.

As it is desirable for the animator to keep his eyes horizontal during the drawing of the picture, and the picture has to be photographed through the same slit, the camera must be so designed, that its slit is horizontal for correct reproduction. The objective of the camera can be therefore a reduced scale model of the projection optics, as shown in Figs. 15 and 16. Both the focal length and the aperture width may be reduced in the same ratio.

It may be noted, that as the lenticular plates 54 and 62 merely reproduce the spatial figure in the same position as it has been drawn, the lenticules of the plates do not at all enter into the conditions determining correct reproduction, but can be determined entirely from secondary considerations. In order to avoid loss of definition at right angles to the lenticles, it is preferable to use very finely ruled plates.

So far I have described only the methods for producing linear black-white drawings. The same method can be extended however also to "half-tint" drawings, with surfaces shaded in any intermediate value. In this case the outlines may be drawn with thin lines by means of a small circular hole 56, but for the shading of the surfaces this is replaced by a narrow slit of suitable length, parallel to the lenticules. This slit forms the equivalent of a brush. The value of the shading depends on the speed of drawing, and on the intensity of the light source. It is continually controlled by the eye.

But once the outlines are drawn, it is not necessary to fill in the surface by the same method. The reason is, that in binocular vision depth can be perceived only where there is contrast. We can not ascertain the distance of a homogeneously shaded surface by focussing the eyes. Whatever the relative tilt of the eyes, they will always see the same. We judge the distance of surfaces only from the outlines which are more or less sharp, so that the eyes can adjust themselves to one another until they see maximum contrast. We can also judge the distance of a surface by contrasting objects, which by our familiarity with the object we deem to be on the surface. For instance we can judge whether a person standing in front of us is fat or thin by the difference in distance between his outlines and the buttons on his coat, but also by the distribution of the shadows on the coat. Therefore once the outlines are drawn, the surfaces can be filled in and shaded in just the same way as flat pictures. How this is done may be explained in connection with Figs. 32, 33 and 34.

Fig. 32 is the image of a surface bounded by a straight line—of zero thickness—parallel to the plane of the film. In this case the image of the line consists of a number of identical parallelogramma, each extending over one zone. Their thickness as shown is the irreducible thickness, obtained with very small slit width, arising out of the loss of vertical definition by the lenticulation. If the slit is opened out, there is in addition some loss of horizontal definition, and the parallelogramma widen out further. The boundary line appears therefore broken, but nevertheless it is possible to shade it, or to color it, as the broken line is completed to a continuous zig-zag line by the lines dividing the zones. We have only to shade or to color the drawing at one side of said zig-zag line, as shown in the figure.

This can be carried out particularly easily in the case of true "half-tint" pictures. In this case the boundary line is not drawn with a small hole, but with a slit of suitable width, parallel to the lenticules, as described above, and the line is not made black, but of the same tint as desired for the edge of the surface. In this case whilst e. g. the left edges of the parallelogramma in Fig. 32 remain where they are, the right edges move to the right, inside the surface, and they can be painted over with a brush, without touching the zig-zag line at the left.

This very simple method has the inconvenience, that there will be some departure from the homogeneous shading where the paint covers the areas blackened by light. This can be avoided as shown in Fig. 33, as follows: Instead of a photographic paper or film a paper or film is used coated with one of the materials known in photogravure, which under the influence of light are changed in such a way as to admit e. g. greasy paint, or to use a greasy "resist" which can be washed off except where it was illuminated. The paper or film itself may be ruled with a great number of fine grooves 64 parallel to the lenticules. After drawing the outlines with light, these can be painted over with greasy paint if necessary, which will adhere only to the exposed parts, and the surfaces themselves are filled in with water colours. These will run by capillary action up to the greasy outline, but not beyond it. In the example shown in Fig. 33 the painted area is at the right of the boundary, which is the image of a straight line not parallel to the plane of the drawing.

The boundaries in the foregoing examples were lines, e. g. edges on objects such as a house, which have a fixed spatial position, and will appear as outlines to eyes in any position within certain limits. Round objects however will have in general outlines which appear in different spatial position, according to the position of the eye. It is shown in Fig. 34 that there is no essential difference in films according to the invention between the representation of edges and the contours of round objects. The upper part of the figure shows in elevation a sphere 65 resting on the—lenticular—plate 66 itself. For simplicity the sphere may be considered small against the distance from the slit, and the slit may be parallel to the plane of the drawing. Seen from different directions, different circles will appear as outlines. The lower part of the figure shows the image itself. It can be seen that this consists of a broken sequence of curved trapezoids. Looking at the middle one, which has almost zero thickness, it can be immediately recognized that it is not an image of a line in space, but of an outline, as it is curved, i. e. represents points at different distances. The image of the sphere represents again a continuous zig-zag line from the point of view of shading or coloring. But in producing the image, the original method must be somewhat modified. Two corresponding shutters with small holes must be fitted to the slits 52 and 58 in Fig. 30, so that the sphere is illuminated and seen only from one position of the eye. For every position of the shutter the apparent outline must be drawn, and if the shutter is moved over the whole slit width, there results an image as shown in Fig. 34. This procedure will be necessary however only in the case of very large round objects, such as whales or balloons. Otherwise it will be sufficient to draw a middle outline, and produce the impression of roundness by suitable shading.

The methods described are also suitable for the production of animated stereoscopic cartoons in natural colors. If the outlines can be in black, or in whatever color the photosensitive material shows after fixing and dying, the surfaces have to be only filled in in the right colors. If however it is desired to show the outlines also in different colors, or not to show sharp lines at all but merely surfaces, it is preferable to use a photosensitive material which after exposure and suitable chemical treatment shows up only just sufficiently to be seen, but differs from the non-exposed parts e. g. in its capacity of adsorbing greasy paint. In this case the outlines are painted over e. g. with suitable greasy paint, and the rest with water colors. Or the outlines are drawn with a wide slit, as explained above, painted over with e. g. greasy paint, and after subjecting the whole material to such a treatment that it admits grease, the surfaces are also painted in with greasy paint. Methods suitable for this purpose are known in themselves in the technique of photogravure.

What I claim as new and desire to secure by Letters Patent of the United States is:

1. Apparatus for projecting in relief pictures recorded on lenticular photographic material with cylindrical lenticules at substantially less than right angles to the horizontal, comprising an optical system serving as a projector objective, a lens between said objective and the photographic material which has its lenticular side facing away from the objective, opposite said lenticular side an illuminator slit inclined against the lenticule axes, said lens being so designed and adjusted that in the absence of the lenticular photographic material it forms an image of the illuminator slit in the plane of the exit pupil of the objective, whilst said lens and the objective together image the picture on a projection screen.

2. Apparatus for projecting in relief pictures recorded on lenticular photographic material, according to claim 1, comprising an astigmatic optical system for illuminating the picture frame through the illuminator slit, said astigmatic system comprising a light source of high intrinsic brilliancy, a toroidal lens near said source, and a spherical mirror, which produce in every bundle of rays issuing from a point of said source a caustic coinciding with the illuminator slit, and a second caustic, at right angles to the first, near the plane of the frame.

3. Apparatus for projecting in relief pictures recorded on lenticular photographic material according to claim 1, comprising very near to the emulsion a spherical lens, the aplanatic point of which nearly coincides with said emulsion.

4. Apparatus for projecting in relief pictures recorded on lenticular photographic material according to claim 1, comprising very near to the lenticular side of the photographic material a condenser lens, which increases, at least in horizontal direction, the angle of illumination of the positive picture.

5. Apparatus for projecting in relief pictures recorded on lenticular photographic material with cylindrical lenticules at substantially less than right angles to the horizontal, comprising an optical system serving as a projector objective which forms an image of the frame on the projection screen, and between said objective and the gate at least one optical element to be called afocal plate, consisting of a transparent plate ruled on both sides with substantially vertical equidistant cylindrical lenticules, the lenticules facing towards the gate being convex whereas those facing the said objective are concave, the inner focal lines of said lenticules coinciding in pairs, by virtue of said arrangement increasing in horizontal direction the divergence of rays passing through said plate towards the objective.

6. Apparatus for projecting in relief pictures recorded on lenticular photographic material with cylindrical lenticules at substantially less than right angles to the horizontal, comprising an optical system serving as a projector objective which forms an image of the frame on the projection screen, and between said objective and the gate at least one optical element to be called afocal plate, consisting of two transparent sheets of different refractive indices in optical contact with one another, the sheet with the lower refractive index being nearer to the gate, and being embossed with convex cylindrical impressions, whereas the other sheet is embossed with concave cylindrical impressions of the same spacing, each convex and concave lenticule forming an afocal pair with coinciding inner focal surfaces, by virtue of said arrangement increasing in horizontal direction the divergence of rays passing through said plate towards the objective.

7. Apparatus for projecting in relief pictures recorded on lenticular photographic material with cylindrical lenticules at substantially less than right angles to the horizontal, comprising an optical system serving as a projector objective which forms an image of the frame on the projection screen, and between said objective and the gate at least one optical element to be called afocal plate, consisting of a transparent plate ruled on both sides with substantially vertical equidistant cylindrical lenticules, the lenticules facing towards the gate being convex whereas those facing the said objective are concave, the inner focal lines of said lenticules coinciding in pairs, said afocal plate being arranged in a plane inside the projector in which a real intermediate image of the frame is formed.

8. Apparatus for taking pictures in relief on an elongated lenticular film with cylindrical lenticules at substantially less than right angles to the transversal direction of the film, comprising means for discontinuous motion of said film, an optical system serving as objective, and in the plane of the aperture of said objective at a distance large against the focal length of the lenticules a stop with two parallel edges at an acute angle to the lenticule axes.

9. Apparatus for taking pictures in relief on an elongated lenticular film with cylindrical lenticules at substantially less than right angles to the transversal direction of the film, comprising means for discontinuous motion of the film, an optical system serving as an objective, and in the aperture plane of said objective at a distance from the film large against the focal distance of the lenticules a slit-shaped stop with two parallel edges including an acute angle with the lenticule axes, said slit having such extension at right angles to the lenticule axes that its ratio to the focal length of the objective is the same as the effective aperture ratio of the lenticules, so that the images of said stop cover the whole strip-shaped zone behind every lenticule, and said zones which are displaced in relation to one another in the longitudinal direction of the film cover the photographic emulsion without gaps and without overlapping.

10. Apparatus for taking pictures in relief on an elongated lenticular film with cylindrical lenticules at substantially less than right angles to the transversal direction of the film, comprising means for discontinuous motion of said film, an optical system serving as an objective, in the plane of the aperture of the objective, at a distance from the film large against the focal length of the lenticules a slit shaped stop with two parallel edges at an acute angle to the lenticule axes, adapted to be tilted together so as to include variable acute angles with the lenticule axes, and two edges parallel to the lenticule axes limiting the extension of the slit in the direction at right angles to the lenticule axes, which are not affected by the tilting movement of the first named two edges.

11. Apparatus for taking pictures in relief on an elongated lenticular film with cylindrical lenticules at substantially less than right angles to the transversal direction of the film, comprising means for discontinuous motion of said film, an optical system serving as an objective, in the plane of the aperture of the objective, at a distance from the film large against the focal length of the lenticules a slit shaped stop with two parallel edges adapted to be tilted together so as to include variable acute angles with the lenticule axes, and two edges parallel to the lenticule axes limiting the extension of said stop in the direction at right angles to the lenticule axes which are not affected by the tilting movement, means being provided for mechanically linking said tilting movement with the axial focusing movement of the objective in such a way that the extension of the slit shaped stop in the direction of the lenticule axes varies in proportion to the distance at which the objective is sharply focused.

12. Apparatus for taking pictures in relief on an elongated lenticular film with cylindrical lenticules at substantially less than right angles to the transversal direction of the film, comprising means for discontinuous motion of said film, an optical system serving as an objective, in the plane of the aperture of said objective, at a distance large against the focal length of the lenticules a slit shaped stop with two parallel edges at an acute angle to the lenticule axes, and near said stop color filters adapted to cover alternatingly zones of said aperture in a recurrent sequence.

13. A system of recording and projecting pictures in stereoscopic relief, comprising taking apparatus adapted to produce discontinuous longitudinal motion of an elongated film, with optical means to produce an aerial image of the scene to be recorded in proximity of the light sensitive layer of said film, a plurality of cylindrical lenticules with axes including substantially less than right angles with the transversal direction of the film, said lenticules having their focal planes in the light sensitive layer of said film, and means to restrict the light admitted to form said aerial image to rays which pass through a narrow slit shaped zone in proximity to a line of viewing points, said line of viewing points being disposed at a distance from the film large against the focal length of the lenticules and forming an acute angle with their axes, whereby every view of the scene, as seen from any point in said viewing line is recorded simultaneously in a single frame, each elemental zone of the film behind a lenticule recording a strip of the scene in a continuous succession of elemental views, each elemental view corresponding to a single viewing point being recorded in a line parallel to the lenticule axes, and elemental views belonging to different viewing points being displaced against one another in the longitudinal direction of the film, said succession repeating itself in adjacent elemental zones, which zones are also displaced relative to one another in the longitudinal direction of the film, and projection apparatus, to reconstruct an aerial image of the recorded scene by projecting all views simultaneously, comprising an optical system serving as a projector objective, a plurality of cylindrical lenticules with focal planes in the emulsion of the record, facing away from the objective, opposite said lenticules an illuminator slit inclined against the lenticule axes, and a field lens in proximity of the film at the side facing the objective, said lens being so designed and adjusted that in the absence of the lenticules it forms an image of the illuminator slit in the plane of the exit pupil of the objective, whilst said lens and objective together are adapted to image the record on a projection screen.

14. A system of recording and projecting pictures in stereoscopic relief, comprising taking apparatus adapted to produce discontinuous motion of an elongated lenticular film with cylindrical lenticules at substantially less than right angles to the transversal direction of the film, an optical system serving as an objective, in the aperture plane of said objective a slit-shaped stop at an acute angle to the lenticule axes and at a distance from the film large against the focal length of the lenticules, apparatus suitable for the printing of lenticular negative film on lenticular positive film, in which optical means are provided to compensate for the deviation of the focal length of the camera objective from a standard focal length, and projection apparatus comprising an optical system serving as an objective, means to move the lenticular positive record discontinuously past a projector gate with the lenticules facing away from said objective, opposite said lenticules an illuminator slit inclined against the lenticule axes, and a field lens in proximity of the film on the side facing the objective, said field lens being so designed and adjusted that in the absence of the lenticules it forms an image of the illuminator slit in the plane of the exit pupil of the objective which together with said field lens is adapted to project an image of the record on a projection screen, said illuminator slit being disposed at a standard distance from the projector gate.

15. A system of recording and projecting pictures in stereoscopic relief, comprising taking apparatus adapted to produce discontinuous motion of an elongated lenticular film with cylindrical lenticules at substantially less than right angles to the transversal direction of the film, an optical system serving as an objective, in the aperture plane of said objective a slit-shaped stop at an acute angle to the lenticule axes and at a distance from the film large against the focal length of the lenticules, apparatus adapted to print said negative film on positive lenticular stock with equal but opposite inclination of the lenticules against the longitudinal direction, and projection apparatus comprising an optical system serving as an objective, means to move the lenticular positive record discontinuously past a projector gate with the lenticules facing away from said objective, opposite said lenticules a horizontal illuminator slit, and a field lens in proximity of the film on the side facing the objective, said field lens being adapted to image the illuminator slit in absence of the lenticules in the plane of the exit pupil of the objective, said objective and the field lens together being adapted to produce an image of the record on a projection screen.

DENNIS GABOR.